US007623216B2

(12) United States Patent
Hwang

(10) Patent No.: US 7,623,216 B2
(45) Date of Patent: Nov. 24, 2009

(54) METHOD AND APPARATUS FOR FABRICATING FLAT PANEL DISPLAY

(75) Inventor: Jong Hee Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 406 days.

(21) Appl. No.: 11/475,104

(22) Filed: Jun. 27, 2006

(65) Prior Publication Data

US 2007/0109245 A1 May 17, 2007

(30) Foreign Application Priority Data

Nov. 16, 2005 (KR) ...................... 10-2005-0109703

(51) Int. Cl.
*G02F 1/13* (2006.01)

(52) U.S. Cl. ....................................................... 349/192

(58) Field of Classification Search .................. 349/192
See application file for complete search history.

(56) References Cited

U.S. PATENT DOCUMENTS 5,608,422 A * 3/1997 Ikeda ......................... 345/101

FOREIGN PATENT DOCUMENTS

JP 2005115144 * 4/2005

* cited by examiner

*Primary Examiner*—Charlie Peng
(74) *Attorney, Agent, or Firm*—Morgan, Lewis & Bockius LLP

(57) ABSTRACT

A fabricating method of a flat panel display device includes inspecting the flat panel display device by supplying test data and a test scan signal to data electrodes of the flat panel display device to generate an inspection result, judging a location of a panel defect in the flat panel display device and a degree of the panel defect at the panel defect location in accordance with the inspection result and determining compensation data for compensating the degree of the panel defect, and storing the compensation data for compensating the degree of the panel defect at a data modulation memory of the flat panel display device.

30 Claims, 22 Drawing Sheets

METHOD AND APPARATUS FOR FABRICATING FLAT PANEL DISPLAY

This application claims the benefit of the Korean Patent Application No. P2005-0109703 filed in Korea on Nov. 16, 2005, which is hereby incorporated by reference.

BACKGROUND OF THE INVENTION

1. Field of the Invention

The present invention relates to a flat panel display device, and more particularly, to a method and apparatus for fabricating a flat panel display device that are capable of compensating a panel defect with electrical data.

2. Discussion of the Related Art

Recently, in the information technology society, display devices have been widely utilized more than ever as a visual information communication medium. Cathode ray tube CRT and Braun tube in the current mainstream have problems due to their heavy weights and big sizes. For this reason, flat panel display devices, which overcome those limitations, have attracted considerable attention.

Examples of the flat panel display devices are liquid crystal displays (LCDs), field emission displays (FEDs), plasma display panels (PDPs), organic light emitting diodes (OLED), etc. A typical flat panel display device includes a display panel for displaying a picture. The test process of the flat panel detects panel defects (or mura defects). A panel defect is defined as a display spot accompanying brightness differences on a display screen. The panel defects are mostly generated during a fabricating process and may be seen in a fixed form, such as a dot, line, belt, circle, polygon, etc. or in an undetermined form depending on the cause of the generation. FIGS. 1 to 3 show some examples of the panel defects with various forms according to the related art.

FIG. 1 is a view illustrating a panel defect in an undetermined form, FIG. 2 is a view illustrating a panel defect in a vertical belt shape (or horizontal belt type), and FIG. 3 is view illustrating a panel defect in a fixed form. The panel defect in the vertical belt shape of FIG. 2 is generated mainly due to overlapping exposure, lens number difference, etc. The panel defect in the dot shape of FIG. 3 is generated mainly due to impurities. The pictures displayed in the locations of those panel defects in FIGS. 1-3 appear to be darker or brighter than ambient non-defect areas. Moreover, color differences may be present when the panel defect locations are compared with the non-defect areas.

The panel defects can cause defects in the final products and also decrease the production yield in accordance with the degree thereof. If a flat panel display device with panel defects is shipped as an otherwise good product, the panel defects deteriorate the picture quality, thereby lowering the reliability of the product. Accordingly, various methods, including improving the process technology, have been proposed in order to remove the panel defects. However, the related art can only decrease the panel defects rather than completely remove them.

SUMMARY OF THE INVENTION

Accordingly, the present invention is directed to a method and an apparatus for fabricating a flat panel display that substantially obviate one or more problems due to limitations and disadvantages of the related art.

An object of the present invention is to provide a method and apparatus for fabricating a flat panel display device that are able to compensate a panel defect with electrical data in a fabrication process.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve these and other objects of the invention, a fabricating method of a flat panel display device according to an aspect of the present invention includes inspecting the flat panel display device by supplying test data and a test scan signal to data electrodes of the flat panel display device to generate an inspection result, judging a location of a panel defect in the flat panel display device and a degree of the panel defect at the panel defect location in accordance with the inspection result and determining compensation data for compensating the degree of the panel defect, and storing the compensation data for compensating the degree of the panel defect at a data modulation memory of the flat panel display device.

In another aspect, the fabricating apparatus of a flat panel display device includes an inspection device for inspecting the flat panel display device by supplying test data and a test scan signal to data electrodes of the flat panel display device to generate an inspection result, a panel defect judging device for judging a location of a panel defect in the flat panel display device and a degree of the panel defect at the panel defect location in accordance with the inspection result of the inspection device and determining compensation data for compensating the degree of the panel defect, and a memory recording device for storing the compensation data for compensating the degree of the panel defect at a data modulation memory of the flat panel display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Exemplary embodiments of the present invention will be explained with reference to FIGS. 4 to 21.

Figure 1:
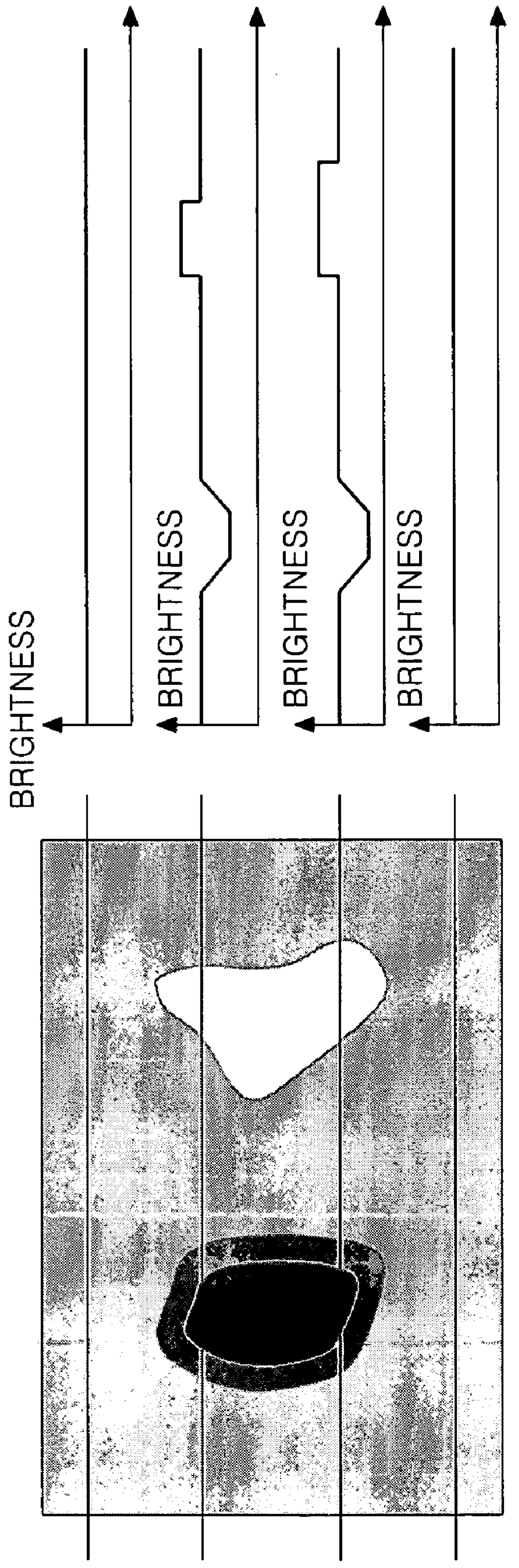
FIG. 1 RELATED ART
FIG. 1 is a view illustrating a panel defect in an undetermined form according to the related art.
Figure 2:
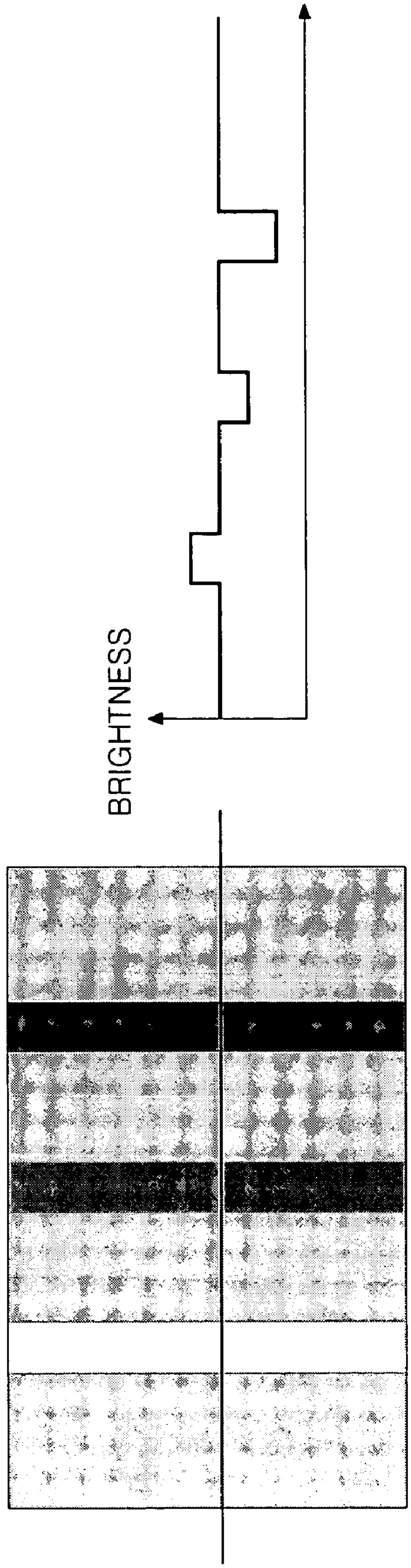
FIG. 2 RELATED ART
FIG. 2 is a view illustrating a panel defect in a vertical belt shape according to the related art.
Figure 3:
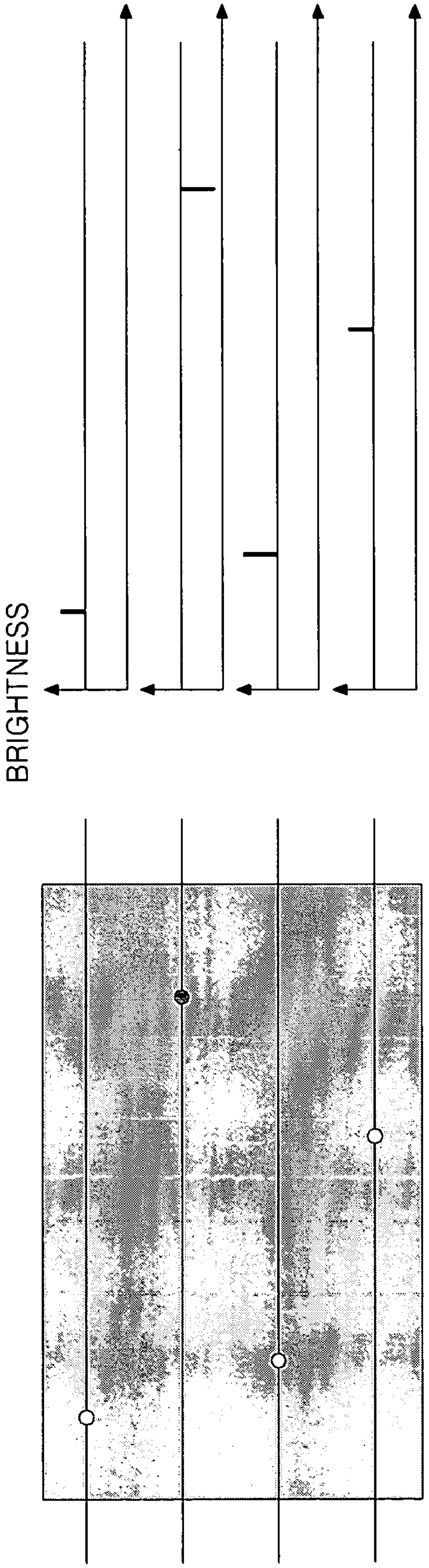
FIG. 3 RELATED ART
FIG. 3 is a view illustrating a panel defect in a dot shape according to the related art.
Figure 4:
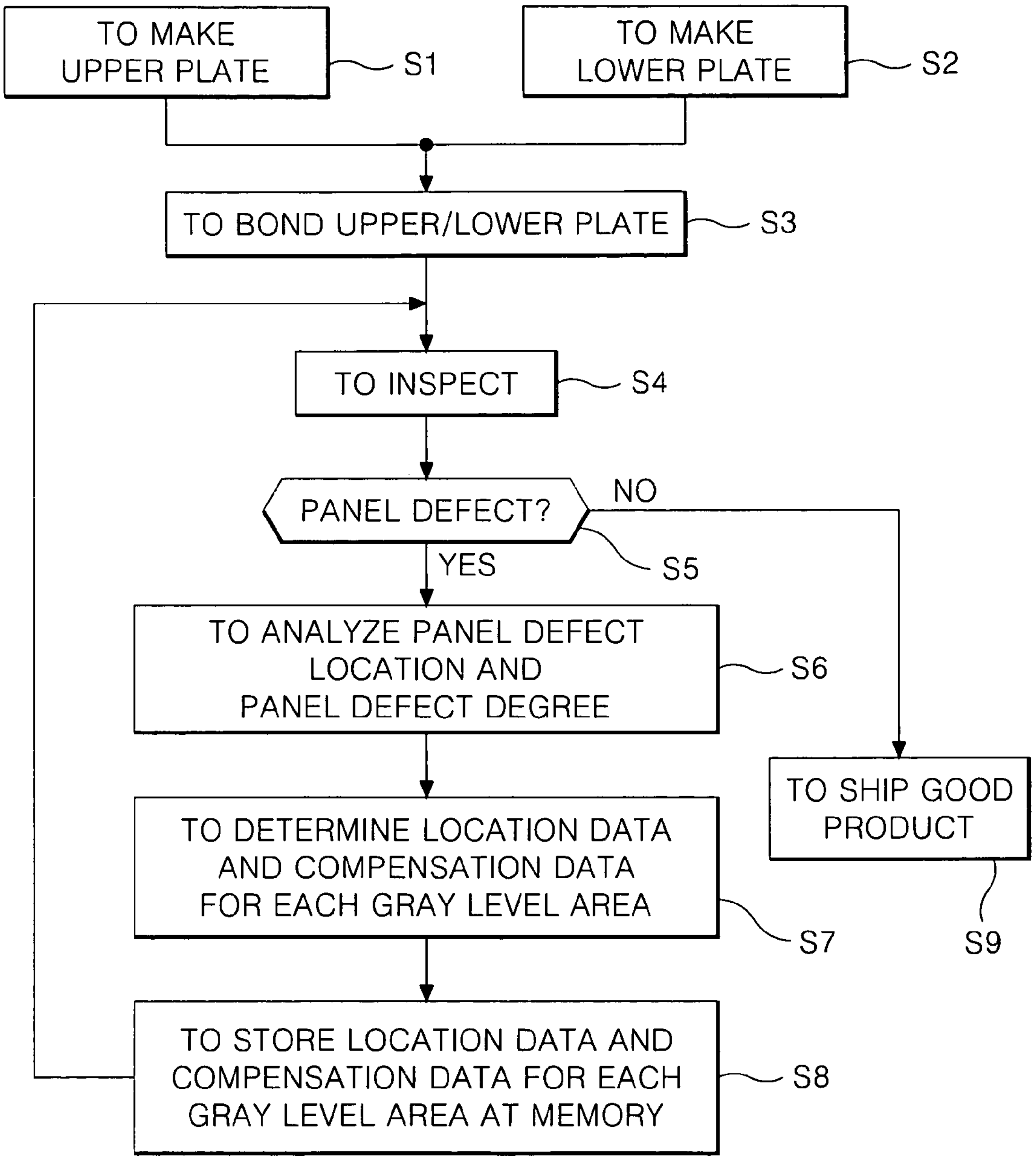
FIG. 4 is a flow chart illustrating a method of fabricating a flat panel display device according to an exemplary embodiment of the present invention.

FIG. 4 is a flow chart schematically illustrating an exemplary method of fabricating a flat panel display device. As illustrated in FIG. 4, in Steps S1 to S3 of this exemplary method, an upper plate and a lower plate are prepared, and then the two plates are bonded with a sealant or frit glass.

After that, at Step S4, a test picture is displayed by applying test data of each gray level to a flat panel display device where the upper and lower plates are bonded, and then an inspection process is performed by an electrical inspection and/or macrography on the test picture to inspect a panel defect, i.e., a display spot. If the panel defect is detected on the flat panel display device at Step S5, a location where the panel defect appears and a degree of the panel defect are analyzed at Step S6. Then, at Step S7, panel defect compensation data for each gray level area and panel defect location data are determined in a panel defect judging process of the flat panel display device. At Step S8, the panel defect compensation data for each gray level area and the panel defect location data are stored at a non-volatile memory, e.g., EEPROM (Electrically Erasable Programmable Read Only Memory) or EDID ROM (Extended Display Identification Data ROM) where data are renewable or erasable, in a panel defect compensation data recording process of the flat panel display device. The panel defect location data and the panel defect compensation data for each gray level area are changed in accordance with the location and degree of panel defect. Moreover, the panel defect location data and the panel defect compensation data stored at the EEPROM are modulated, and then the modulated data are supplied to the flat panel display device.

On the other hand, if it is detected at Step S5 that the size, number and degree of the panel defect are not greater than an allowable reference value for a good product, the flat panel display device is determined as a good product to be shipped at Step S9.

Next, the fabricating method according to the exemplary embodiment will be further described centering around an active matrix type liquid crystal display device. The method of fabricating the liquid crystal display device may be divided into a substrate cleaning process, a substrate patterning process, an alignment film forming/rubbing process, a substrate bonding/liquid crystal injecting process, a mounting process, an inspection process, a repairing process, etc.

In the substrate cleaning process, impurities with which the substrate surface of the liquid crystal display device is contaminated are removed with a cleaning solution. The substrate patterning process may be further divided into a patterning process of an upper plate (color filter substrate) and a patterning process of a lower plate (TFT array substrate). Color filters, a common electrode, a black matrix, etc. may be formed in the color filter substrate. In the TFT array substrate, signal wire lines such as data lines, gate lines, etc. may be formed, a TFT may be formed at each crossing part of the data and gate lines, and a pixel electrode may be formed at a pixel area between the gate and data lines. The data line is connected to a source electrode of the TFT.

In the alignment film forming/rubbing process, an alignment film may be spread over each of the upper and lower plates and the alignment film may be rubbed with a rubbing cloth, etc. In the substrate bonding/liquid crystal injecting process, the upper and lower substrates may be bonded together utilizing a sealant, and liquid crystal and spacers may be injected through a liquid crystal injection hole, and then the liquid crystal injection hole is sealed off. In the mounting process, a tape carrier package (TCP) on which integrated circuits (IC) such as a gate drive IC and a data drive IC are mounted may be connected to a pad part on the substrate. The drive IC may be mounted directly on the substrate by a chip-on-glass (COG) method other than a tape automated bonding (TAB) method utilizing the foregoing TCP.

The inspection process may include an electrical inspection carried out after the various signal wire lines and the pixel electrode are formed in the lower substrate, and an electrical inspection and a macrography carried out after the substrate bonding/liquid crystal injecting process. As the result of the inspection process carried out after the substrate bonding/liquid crystal injecting process, if the panel defect is detected, the location data and compensation data for the panel defect are determined, and the location data and compensation data are stored at the EEPROM. Herein, the EEPROM is mounted on a printed circuit board PCB of the liquid crystal display device. A panel defect compensation circuit that modulates input digital video data utilizing the data of the EEPROM, and a timing controller that supplies the data from the panel defect compensation circuit to the data drive circuit and controls operation timings of the data drive circuit and the scan drive circuit, are mounted together on the printed circuit board. The panel defect compensation circuit may be embedded in the timing controller. The drive circuit of the liquid crystal display device that is judged as a final good product to be shipped may include the EEPROM and the panel defect compensation circuit along with the timing controller, the data drive circuit and the scan drive circuit.

Figure 5:
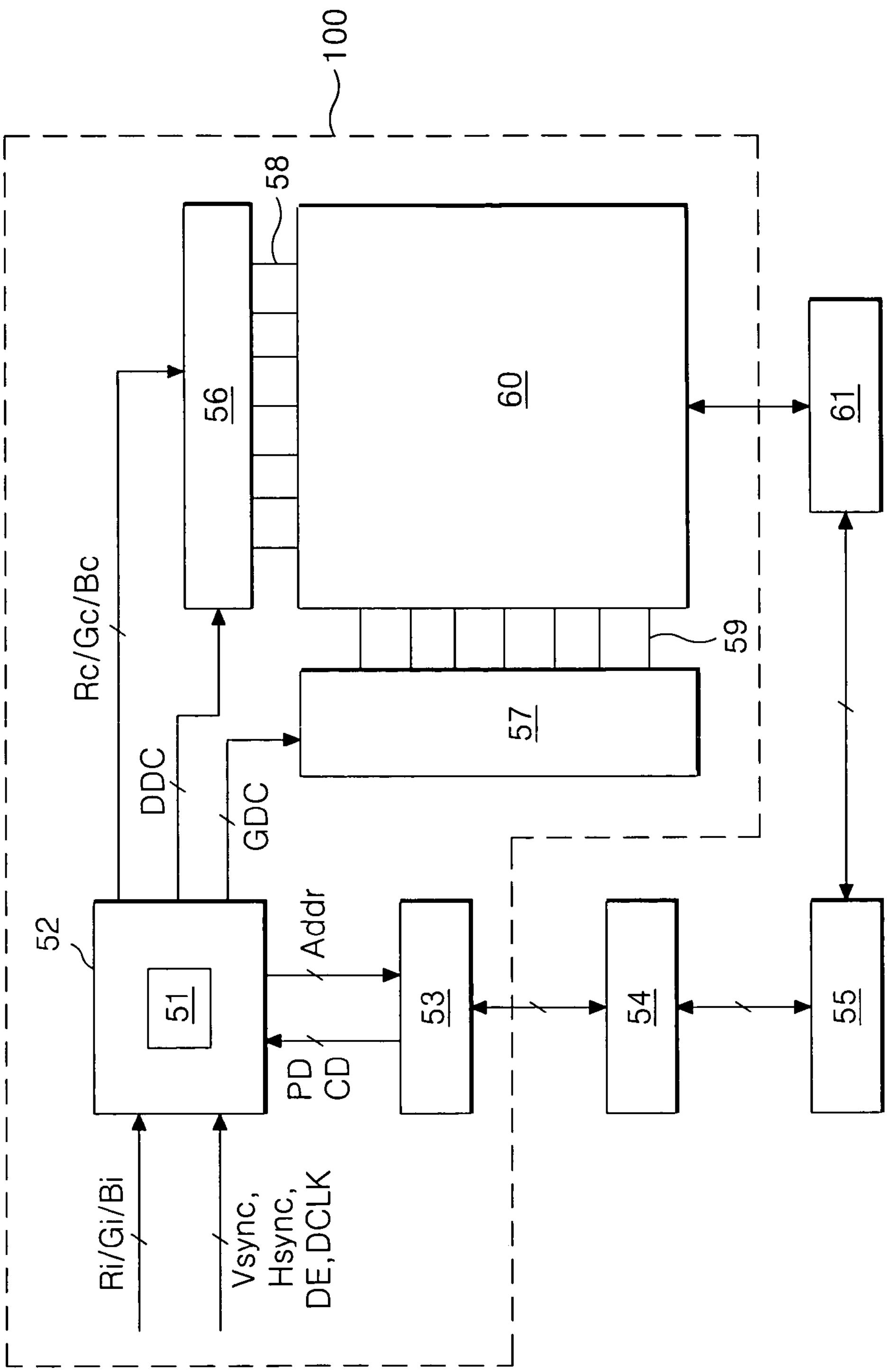
FIG. 5 is a block diagram schematically illustrating a flat panel display device, an inspection device and a panel defect compensation device according to an exemplary embodiment of the present invention.

FIG. 5 is a block diagram schematically illustrating a fabricating apparatus of a flat panel display device 100 according to an exemplary embodiment of the present invention.

As shown in FIG. 5, the fabricating apparatus includes a ROM recorder 54 that serves to access an EEPROM 53 of the flat panel display device 100, a computer 55 connected to the ROM recorder 54, and an inspection device 61 connected to the computer 55. The flat panel display device 100 includes a flat panel 60, a data drive circuit 56, a scan drive circuit 57 and a timing controller 52. In the flat panel, data lines 58 cross scan lines 59 and pixels are arranged in a matrix shape. The data drive circuit 56 serves to supply digital video data Rc/Gc/Bc where the panel defect is compensated to the data lines 58. The scan drive circuit 57 serves to sequentially supply a scan pulse to the scan lines 59. The timing controller 52 serves to control the data drive circuits 56 and the scan drive circuit 57. The flat panel display device 100 may be implemented as liquid crystal display (LCD), field emission display (FED), plasma display panel (PDP), organic light emitting diode (OLED), etc.

The timing controller 52 further includes a panel defect compensation circuit 51 embedded therein. The panel defect compensation circuit 51 serves to increase or decrease the compensation data to the input digital video data Ri/Gi/Bi corresponding to the panel defect location, thereby modulating the digital video data. A detailed description for the panel defect compensation circuit 51 will be given later. The timing controller 52 supplies to the data drive circuit 56 the digital video data Ri/Gi/Bi that has been modulated by the panel defect compensation circuit 51 as well as the digital video data Ri/Gi/Bi that corresponds to a non-defect area and is not modulated. Moreover, by utilizing vertical and horizontal synchronization signals Vsync, Hsync, a dot clock DCLK and a data enable signal DE, the timing controller 52 generates a data drive control signal DDC that controls the operation timing of the data drive circuit 56 and a gate drive control signal GDC that controls the operation timing of the gate drive circuit 57.

The data drive circuit 56 converts the compensated digital video data Rc/Gc/Bc from the timing controller 52 into an analog voltage or current that expresses a gray level, and supplies the analog voltage or the current to the data lines 58. The scan drive circuit 57 sequentially applies a scan pulse to the scan lines 59 under control of the timing controller 52, thereby selecting a horizontal line of pixels that are to be displayed. The inspection device 61 supplies test data to the data lines 58 and test scan pulses to the scan lines 59 to inspect a picture displayed in the flat panel display device with a picture measuring device or naked eye when the data and scan drive circuits 56 and 57 are not connected to the flat display panel 60. The inspection device 61 inspects the test picture displayed on the flat display panel 60 under control of the computer 55, while increasing the gray level of the test data by gray levels from the lowest gray level (or peak black gray level) to the highest gray level (or peak white gray level). The test data should have a resolution of not less than 8 bits.

The computer 55 receives a brightness measuring value of pixels for each gray level that are measured by the inspection device 61, thereby calculating a brightness difference between the pixels and judging locations of the pixels where the brightness difference exists in comparison with other pixels as a panel defect area. Also, the computer 55 calculates the location data of the panel defect area and the compensation data that are for compensating the brightness difference of the panel defect area. Moreover, the computer 55 supplies the calculated panel defect location information and panel defect compensation data to the ROM recorder 54. If the renewal of the panel defect location information and the panel defect compensation data is needed due to the change of process condition and the difference between applied models, or if renewal data of the panel defect location information and panel defect compensation data are inputted by an operator, the computer 55 transmits the renewal data to the ROM recorder 54 to make the ROM recorder 54 renew the panel defect location data and panel defect compensation data stored at the EEPROM 53 by utilizing a communication standard protocol such as I2C.

The ROM recorder 54 supplies the panel defect location data PD and panel defect compensation data CD from the computer 55 to the EEPROM 53. Herein, the ROM recorder 54 may transmit the panel defect compensation data to the EEPROM 53 through a user connector. The panel defect compensation data may be transmitted in series through the user connector. A serial clock, a ground power, etc. may also be transmitted to the EEPROM 53 though the user connector. On the other hand, the panel defect compensation data may be transmitted to the EDID ROM instead of the EEPROM 53, and the EDID ROM may store the panel defect compensation data in a separate storage space. The EDID ROM stores seller/manufacturer identification information ID and the variables and characteristics of a basic display device as monitor information data other than the panel defect compensation data. The ROM recorder 54 transmits the panel defect compensation data through a DDC (data display channel) when the panel defect compensation data are stored at the EDID ROM instead of the EEPROM 53. Accordingly, when utilizing the EDID ROM, the EEPROM 53 and the user connector may be removed, thereby reducing an additional development cost. In the following explanation of the exemplary embodiments, the memory at which the panel defect compensation data are stored is regarded as the EEPROM 53. Also, the EEPROM 53 and the user connector may be replaced with the EDID ROM and DDC.

Figure 6:
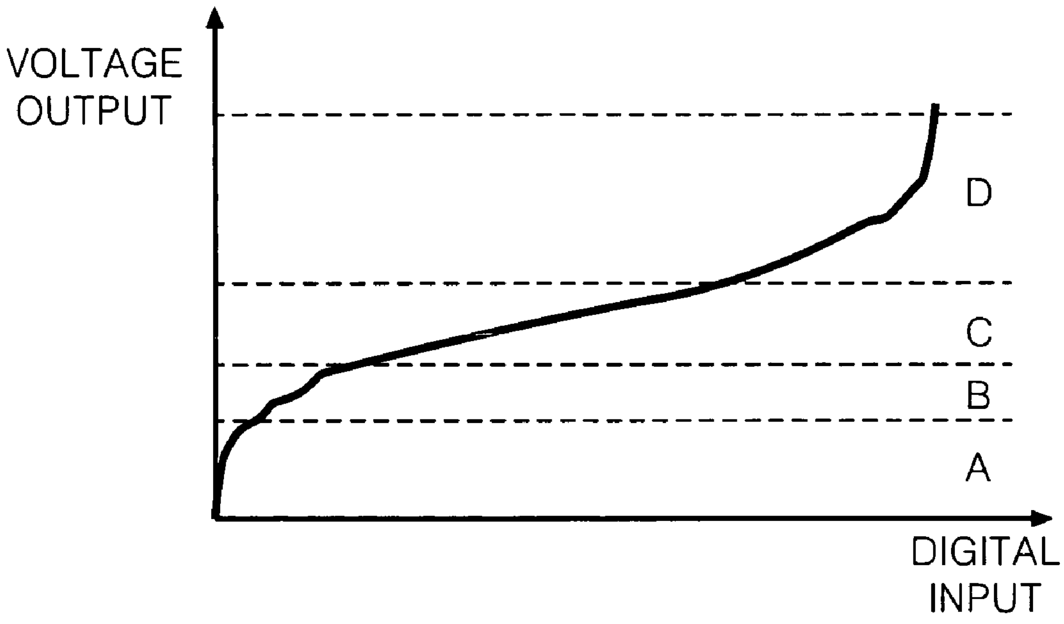
FIG. 6 is a graph schematically illustrating a gamma correction curve of an example in that panel defect compensation data are divided for each gray level and for each gray level section to be set.

The compensation data stored at the EEPROM 53 have non-uniformity of color difference or brightness changed in accordance with the location of the panel defect. Thus, the compensation data should be optimized for each location and further for each gray level in consideration of gamma characteristic as shown in FIG. 6. FIG. 6 is a graph schematically illustrating a gamma correction curve of an example in that the panel defect compensation data are divided for each gray level and for each gray level section to be set.

As shown in FIG. 6, the compensation data may be set for each gray level in each of R, G and B, or may be set for each gray level section (A, B, C and D) inclusive of a plurality of gray levels. For example, the compensation data may be set as an optimized value for each location, i.e., '+1' in a 'panel defect 1' location, '−1' in a 'panel defect 2' location and '0' in a 'panel defect 3' location, and may be further set as an optimized value for each gray level section, i.e., '0' in a 'gray level section A', '0' in a 'gray level section B', '1' in a 'gray level section C' and '1' in a 'gray level section D'. Thus, the compensation data are made different for each gray level in the same panel defect location, and also different for each panel defect location in the same gray level. The compensation data may be set to be the same value in each of R, G and B data of one pixel upon the brightness correction to be set by the unit of one pixel inclusive of R, G and B sub-pixels. Further, the compensation data may be set to be different in each of the R, G and B data when correcting the color difference. For example, if a red color appears in a specific panel defect location more marked than in a non-defect location, an R compensation value becomes lower than G, B compensation values. The EEPROM 53 stores the panel defect location data PD and the panel defect compensation data CD and a gray level area information (sections A, B, C, D in FIG. 6) in a form of lookup table, and supplies the panel defect location data PD and the compensation data CD from the corresponding address to the panel defect compensation circuit in response to an address control signal from the panel defect compensation circuit 51 that is embedded in the timing controller 52.

Figure 7:
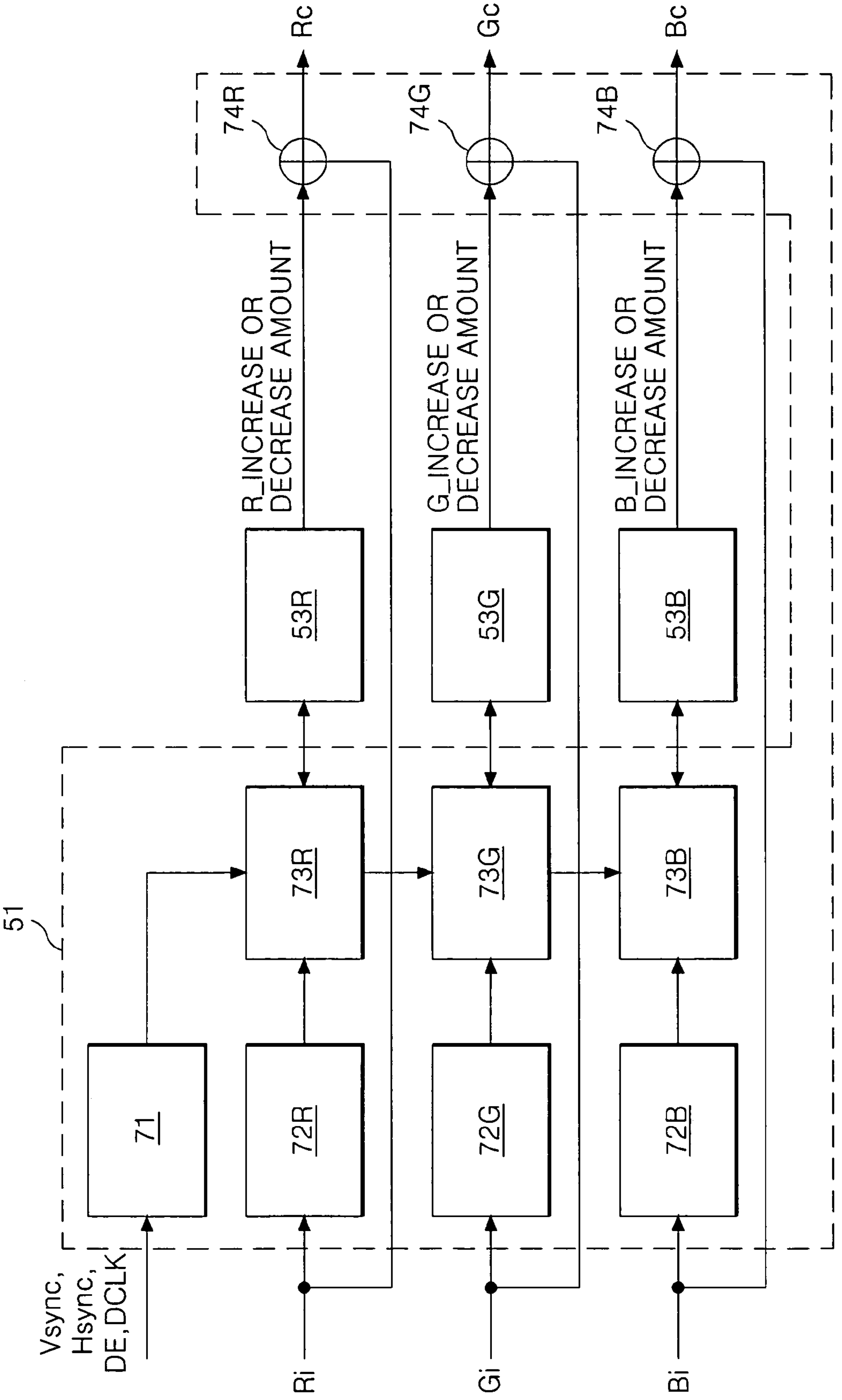
FIG. 7 is a block diagram schematically illustrating a panel defect compensation circuit according to a first exemplary embodiment of the present invention.
Figure 8:
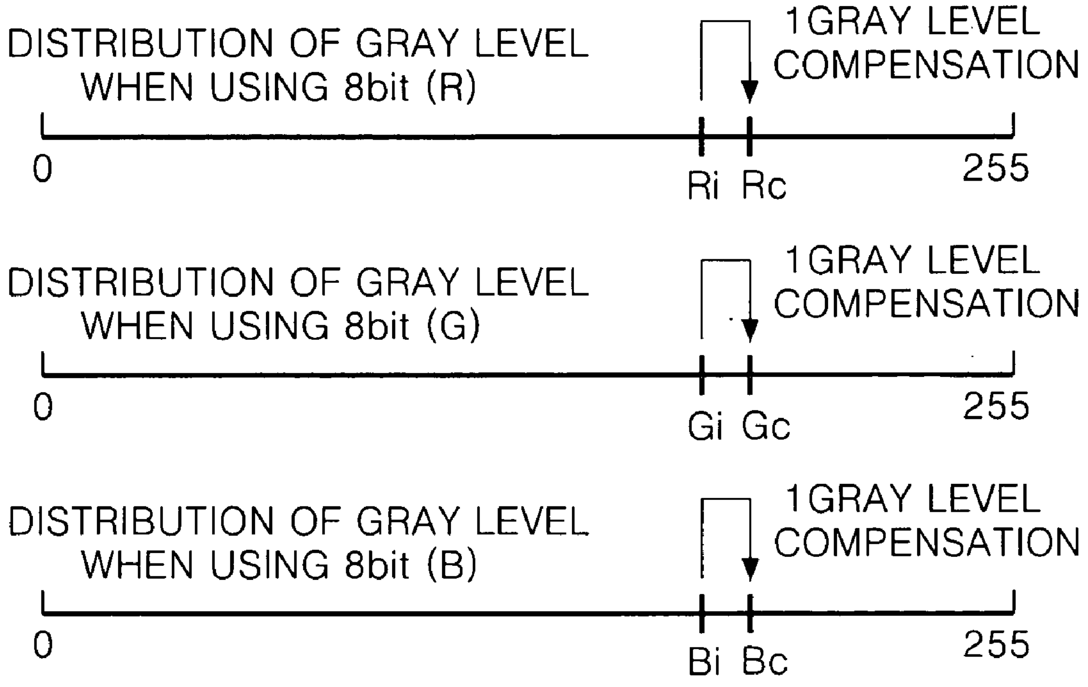
FIGS. 8 and 9 are views schematically illustrating examples of a panel defect compensation result of the panel defect compensation circuit shown in FIG. 7.
Figure 9:
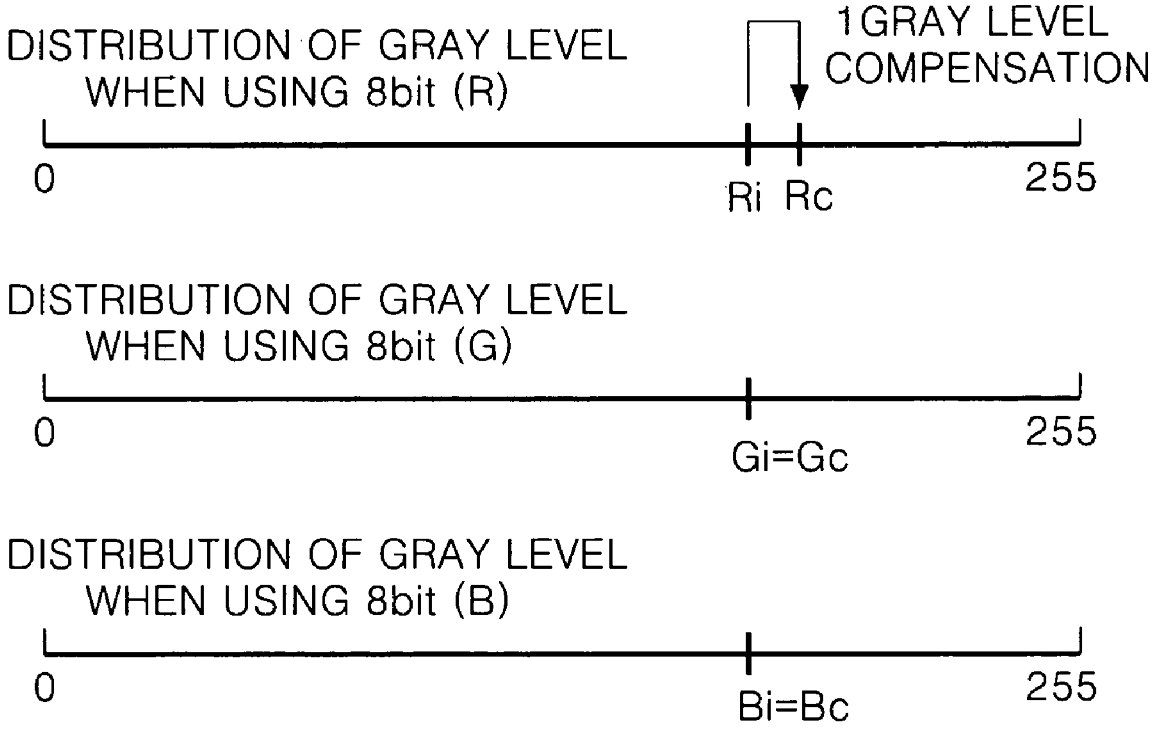

FIGS. 7 to 9 are diagrams schematically illustrating the panel defect compensation circuit 51 and an operation thereof according to a first exemplary embodiment of the present invention.

As shown in FIG. 7, the panel defect compensation circuit 51 includes a location judging part 71, gray level judging parts 72R, 72G and 72B, address generators 73R, 73G and 73B, and calculators 74R, 74G and 74B. The EEPROM 53 includes first to third EEPROM's 53R, 53G and 53B, which stores the panel defect compensation data CD and the panel defect location data PD for red R, green G and blue B, respectively.

The data stored at the first to third EEPROM's 53R, 53G and 53B are set to be different from one another in the same location and the same gray level when the panel defect is compensated by the unit of sub-pixel or in case of color correction. On the other hand, the data are set to be the same in each of the EEPROM's in the same location and the same gray level when the panel defect is compensated by the unit of pixel inclusive of three sub-pixels of red, green and blue or in case of brightness correction. The location judging part 71 judges the display location of the input digital video data Ri/Gi/Bi utilizing vertical/horizontal synchronization signals Vsync, Hsync, a data enable signal DE and a dot clock DCLK.

The gray level judging parts 72R, 72G and 72B analyze the gray level of the input digital video data Ri/Gi/Bi of red R, green G and blue B. The address generators 73R, 73G and 73B generate a read address for reading the panel defect compensation data CD of the panel defect location to supply to the EEPROM's 53R, 53G and 53B if the display location of the input digital video data Ri/Gi/Bi corresponds to the panel defect location by referring to the panel defect location data PD of the EEPROM 53R, 53G and 53B. The panel defect compensation data CD outputted from the EEPROM's 53R, 53G and 53B are supplied to the calculators 74R, 74G and 74B in accordance with the address. The calculators 74R, 74G and 74B add the panel defect compensation data CD to or subtract the panel defect compensation data CD from the input digital video data Ri/Gi/Bi, thereby modulating the input digital video data Ri/Gi/Bi that are to be displayed in the panel defect location. Herein, the calculators 74R, 74G and 74B may include a multiplier that multiplies the panel defect compensation data CD to, or a divider that divides the panel defect compensation data CD from, the input digital video data Ri/Gi/Bi, other than an adder and a subtracter.

FIG. 8 is a view schematically illustrating one example of a panel defect compensation result of the panel defect compensation circuit shown in FIG. 7.

As illustrated in FIG. 8, this example of the panel defect compensation result by the panel defect compensation circuit 51 is that the R compensation data, the G compensation data and the B compensation data are identically set to be '1' and the gray level of the input digital video data Ri/Gi/Bi to be displayed at the panel defect location that is lower by one gray level than the non-defect location is identically increased by one in each color, thereby compensating the brightness of the panel defect location.

FIG. 9 is a view schematically illustrating another example of a panel defect compensation result of the panel defect compensation circuit shown in FIG. 7. As illustrated in FIG. 9, this example of the panel defect compensation result by the panel defect compensation circuit 51 is that the R compensation data is set to be '1' and the G compensation data and B compensation data are set to be '0', thereby compensating the color difference of the input digital video data Ri/Gi/Bi to be displayed at the panel defect location that is lower in the purity of red color than the non-defect location.

Figure 10A:
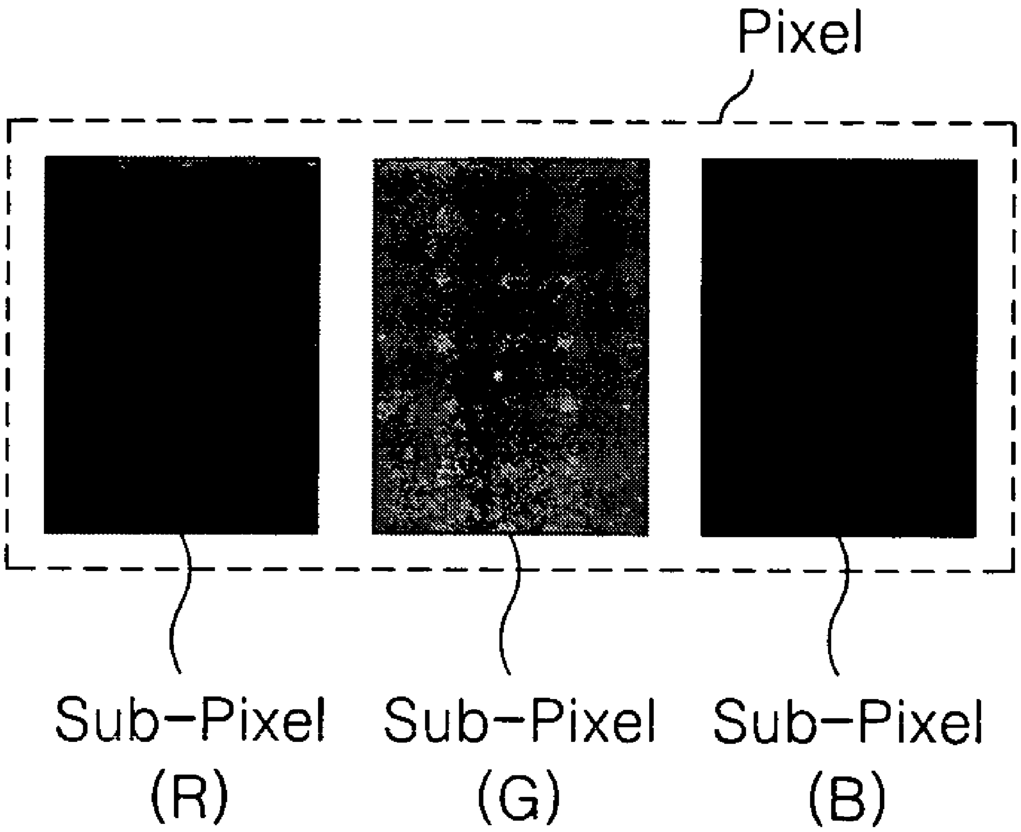
FIGS. 10A and 10B are views schematically illustrating two examples of pixel arrangement.
Figure 10B:
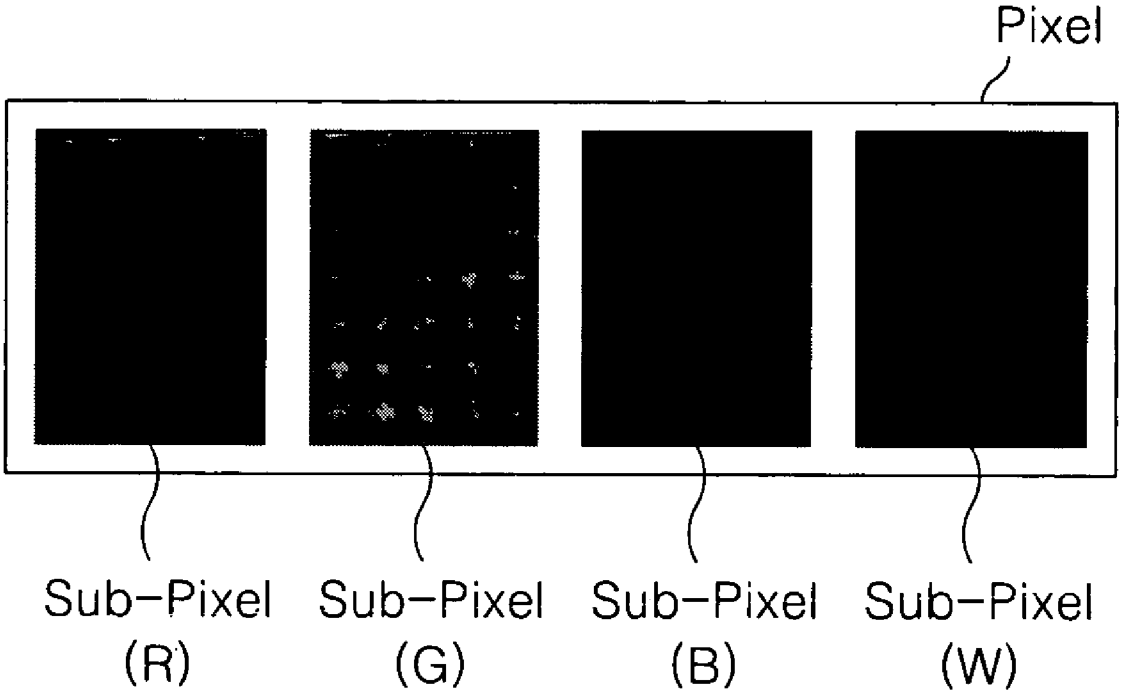

FIGS. 10A and 10B are views schematically illustrating two examples of pixel arrangement. As shown in FIG. 10A, one pixel of the flat panel display panel 60 may include three sub-pixels of red R, green G and blue B. As shown in FIG. 10B, one pixel of the flat panel display panel 60 may also include four sup-pixels of red R, green G, blue B and white W.

Figure 11:
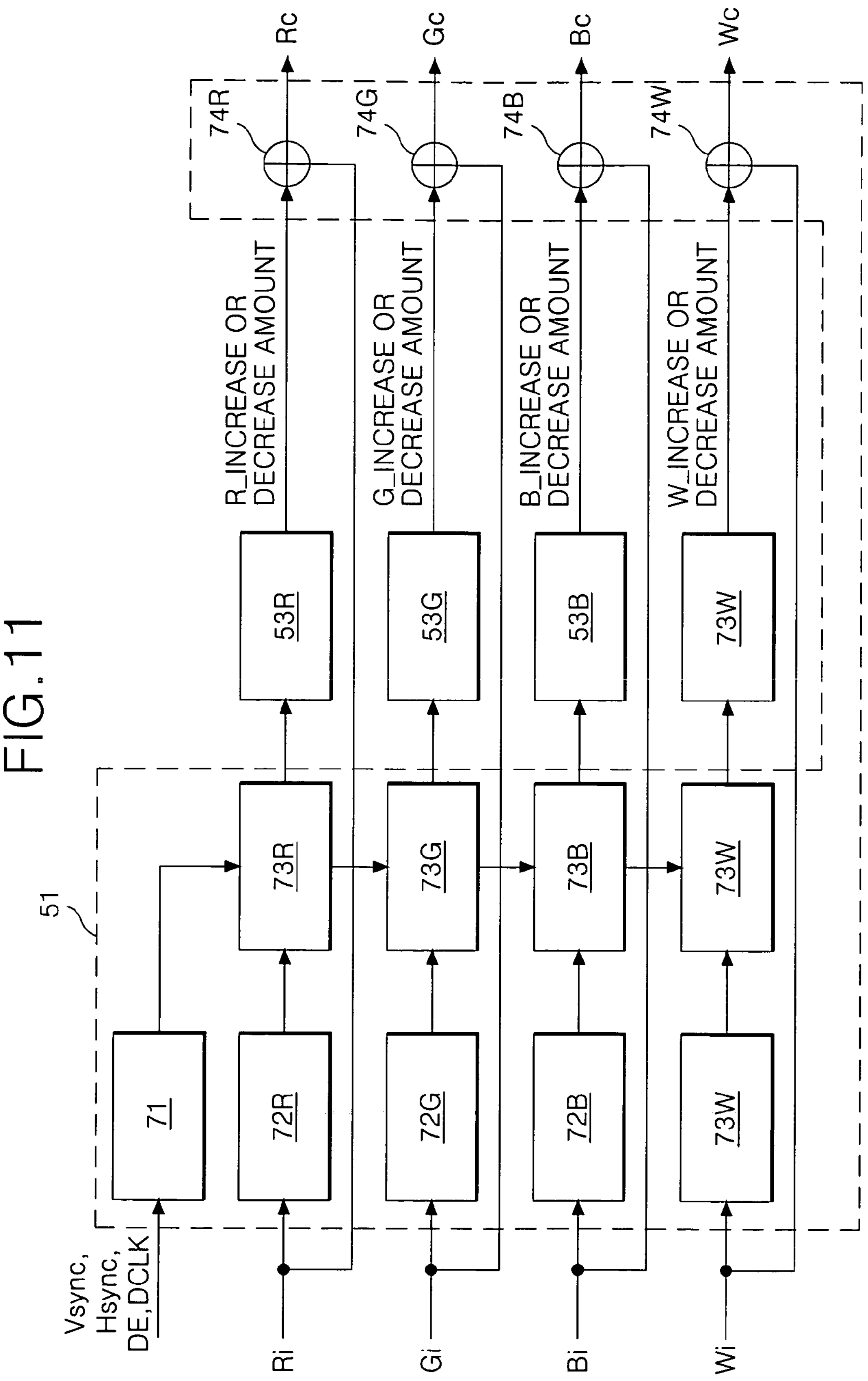
FIG. 11 is a block diagram schematically illustrating a panel defect compensation circuit according to a second embodiment of the present invention.

FIG. 11 is a block diagram schematically illustrating a panel defect compensation circuit according to a second exemplary embodiment of the present invention.

As shown in FIG. 11, in order to modulate the white data W of the panel defect location in the pixel arrangement as in FIG. 10B, a panel defect compensation circuit 51 according to the second exemplary embodiment further includes a gray level judging part 72W, an address generator 73W and a calculator 74W. The EEPROM 53 further includes a third EEPROM 53W at which the compensation data for the white data in the panel defect location are stored in a form of lookup table. If the white data Wi are compensated in this way, the brightness can be compensated in the panel defect location more easily. Moreover, the white data Wi are determined from a brightness information Y that is calculated by taking the input digital video data Ri/Gi/Bi of red, green and blue as variables.

Figure 12:
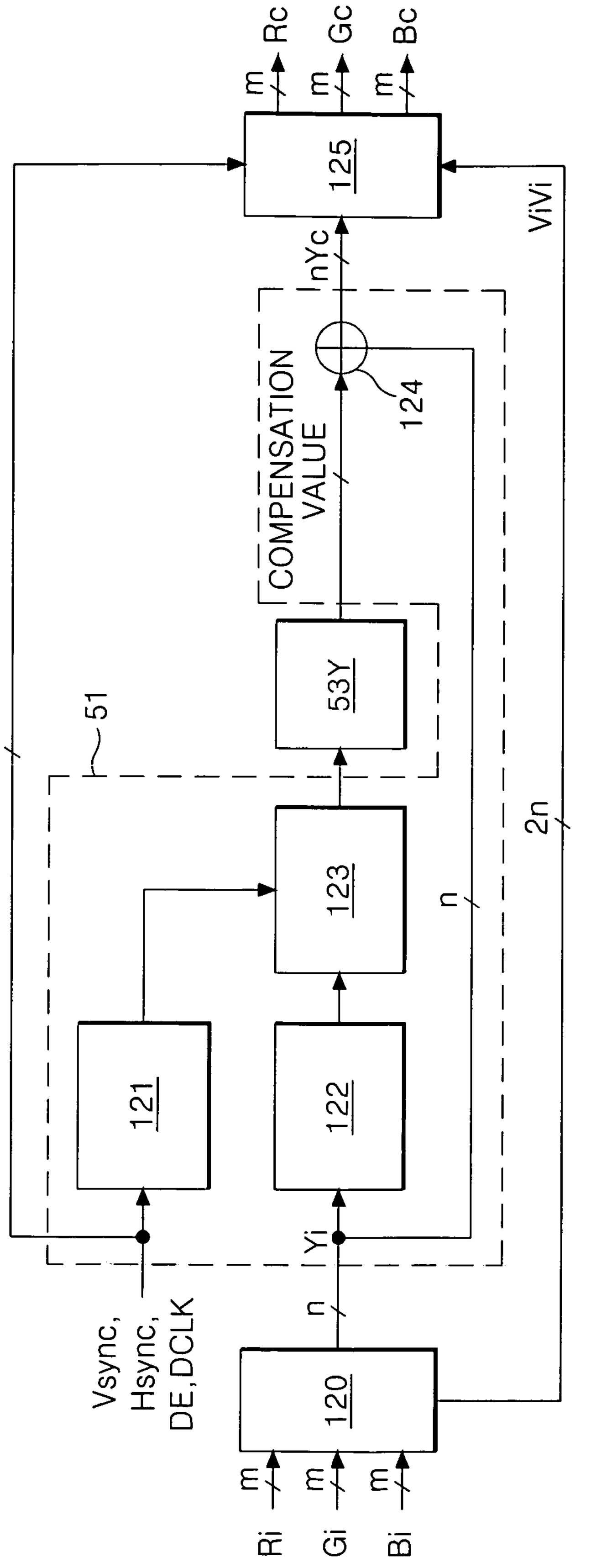
FIG. 12 is a block diagram schematically illustrating a panel defect compensation circuit according to a third embodiment of the present invention.

FIG. 12 is a block diagram schematically illustrating the panel defect compensation circuit 51 and an EEPROM 53Y according to a third exemplary embodiment of the present invention.

As shown in FIG. 12, the panel defect compensation circuit 51 according to the third exemplary embodiment includes an RGB to YUV converter 120, a location judging part 121, a gray level judging part 122, an address generator 123, a calculator 124 and a YUV to RGB converter 125. The EEPROM 53Y stores the panel defect brightness compensation data for each location and for each gray level that are for minutely modulating the brightness information Yi of the input digital video data Ri/Gi/Bi that are to be displayed at the panel defect location. The RGB to YUV converter 120 calculates a color difference value UiVi and a brightness value Yi of n/n/n (n is an integer larger than m) bits utilizing the following Mathematical Formulas 1 to 3 that take the input digital video data Ri/Gi/Bi having the R/G/B data of m/m/m bits.

$$Yi=0.299Ri+0.587Gi+0.114Bi \quad \text{[Mathematical Formula 1]}$$

$$Ui=-0.147Ri-0.289Gi+0.436Bi=0.492(Bi-Y) \quad \text{[Mathematical Formula 2]}$$

$$Vi=0.615Ri-0.515Gi-0.100Bi=0.877(Ri-Y) \quad \text{[Mathematical Formula 3]}$$

The location judging part 121 judges the display location of the input digital video data (Ri/Gi/Bi) utilizing vertical/horizontal synchronization signals Vsync, Hsync, a data enable signal DE and a dot clock DCLK. The gray level judging part 122 analyzes the gray level of the input digital video data Ri/Gi/Bi based on the brightness information from the RGB to YUV converter 120. The address generator 123 generates a read address for reading the panel defect brightness compensation data of the panel defect location to supply to the EEPROM 53Y if the display location of the input digital video data Ri/Gi/Bi corresponds to the panel defect location by referring to the panel defect location data of the EEPROM 53Y. The panel defect brightness compensation data outputted from the EEPROM 53Y are supplied to the calculator 124 in accordance with the address. The calculator 124 adds the panel defect brightness compensation data of the EEPROM 53Y to or subtracts the panel defect brightness compensation data of the EEPROM 53Y from the brightness value Yi of n bits from the RGB to YUV converter 120. Herein, the calculator 124 may include a multiplier that multiplies the panel defect brightness compensation data to or a divider that divides the panel defect brightness compensation data from the brightness value Yi of n bits other than an adder and a subtracter. The brightness value Yc modulated by the calculator 124 increases or decreases the extended brightness value Yi of n bits, thereby minutely adjusting the brightness of the input digital video data Ri/Gi/Bi to the factional part. The YUV to RGB converter 125 calculates the modulated data Rc/Gc/Bc of m/m/m bits utilizing the following Mathematical Formulas 4 to 6 by taking the brightness value Yc modulated by the calculator 124 and the color difference value UiVi from the RGB to YUV converter 120 as variables.

$$R=Yc+1.140Vi$$ [Mathematical Formula 4]

$$G=Yc-0.395Ui-0.581Vi$$ [Mathematical Formula 5]

$$B=Yc+2.032Ui$$ [Mathematical Formula 6]

In this way, the panel defect compensation circuit according to the third exemplary embodiment converts the R/G/B video data that are to be displayed in a panel defect location into a brightness component and a color difference component by noticing that a human eye is more sensitive to the brightness difference than to the color difference, and adjusts the brightness of the panel defect location by extending the number of bits of Y data that include the brightness information among them, thereby minutely controlling the brightness at the panel defect location of the flat panel display device.

The panel defect compensation circuit 51 according to fourth to sixth exemplary embodiments of the present invention adjusts the data that are to be displayed at the panel defect location, by utilizing frame rate control (FRC) and dithering, which are known as methods for minutely adjusting picture quality. The frame rate control and dithering will be explained with reference to FIGS. 13 to 15.

Figure 13:
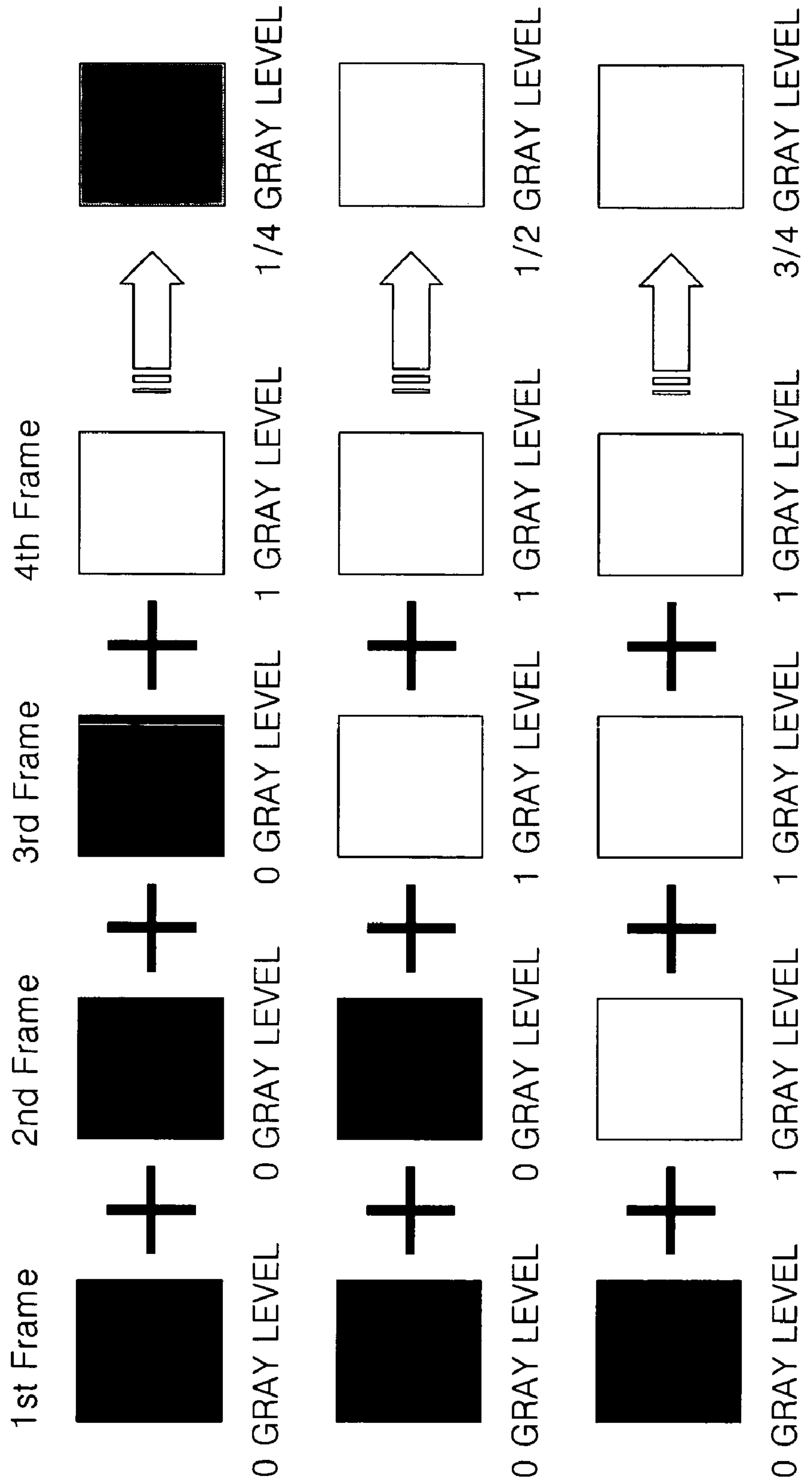
FIG. 13 is a view schematically illustrating an example of frame rate control.

FIG. 13 is a view schematically illustrating an example of the frame rate control. In the frame rate control of FIG. 13, assume that there is one pixel where a '0' gray level and a '1' gray level are sequentially displayed for four frames. Thus, as shown in (A) of FIG. 13, if the pixel displays the '0' gray level for three frames and the '1' gray level for the rest one frame, an observer feels a '¼' gray level for the four frames due to an integral effect of his retina. As shown in (B) of FIG. 13, if the same pixel displays the '0' gray level for two frames and the '1' gray level for the rest two frames, the observer feels a '½' gray level for the four frames due to an integral effect of his retina. As shown in (C) of FIG. 13, if the same pixel displays the '0' gray level for one frame and the '1' gray level for the rest three frames, the observer feels a '¾' gray level for the four frames due to an integral effect of his retina.

Figure 14:
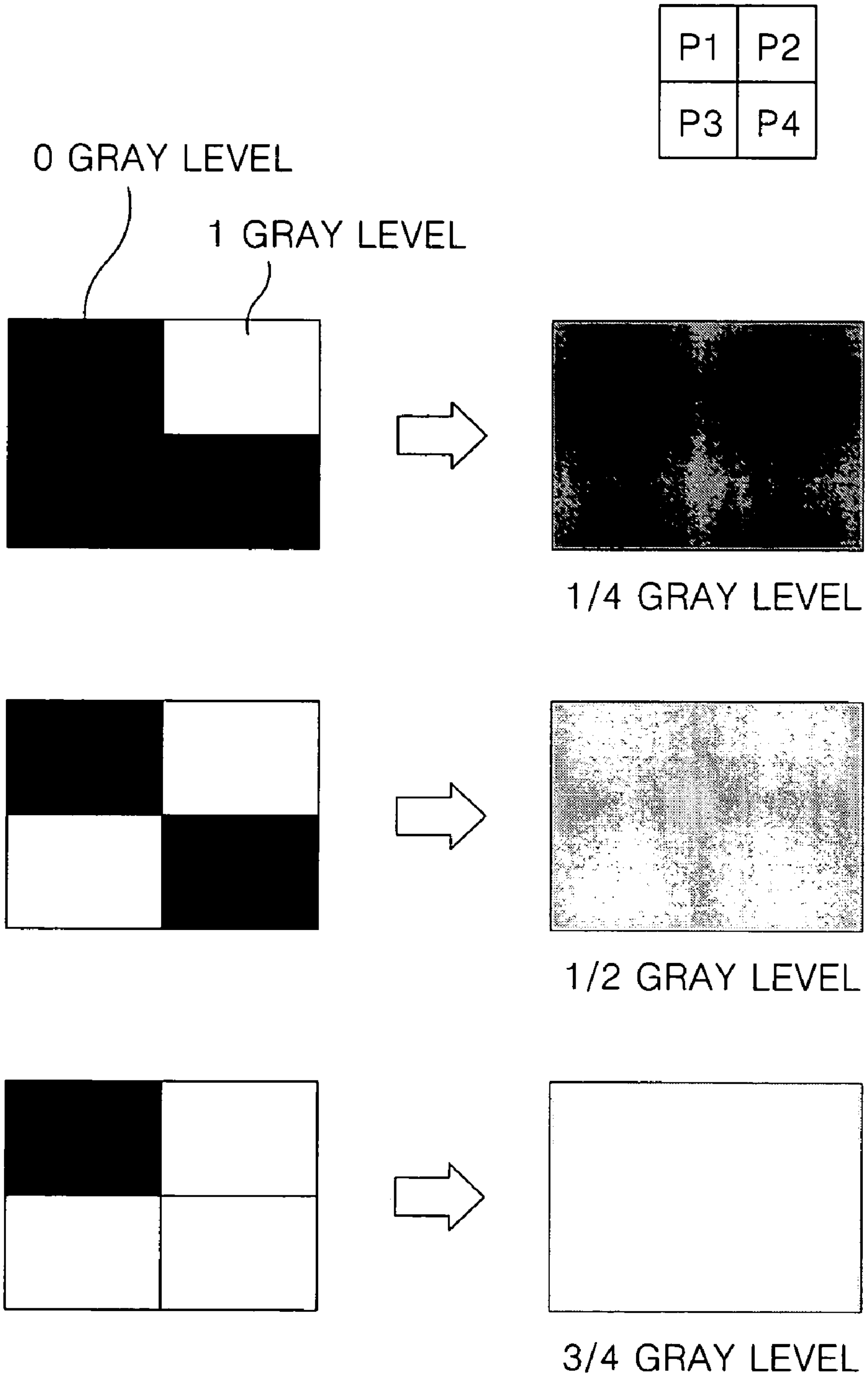
FIG. 14 is a view schematically illustrating an example of dithering.

FIG. 14 is a view schematically illustrating an example of dithering. In the dithering of FIG. 14, assume that there is a unit pixel window inclusive of four pixels P1, P2, P3 and P4. As shown in (A) of FIG. 14, if the three pixels P1, P3, P4 within the unit pixel window display the '0' gray level and the rest one pixel P2 displays the '1' gray level, an observer feels a '¼' gray level in the unit pixel window for the corresponding period. As shown in (B) of FIG. 14, if the two pixels P1, P4 within the unit pixel window display the '0' gray level and the rest two pixels P2, P3 display the '1' gray level, the observer feels a '½' gray level in the unit pixel window for the corresponding period. As shown in (C) of FIG. 14, if one pixel P1 within the unit pixel window displays the '0' gray level and the rest three pixels P2, P3, P4 display the '1' gray level, the observer feels a '¾' gray level in the unit pixel window for the corresponding period.

Figure 15:
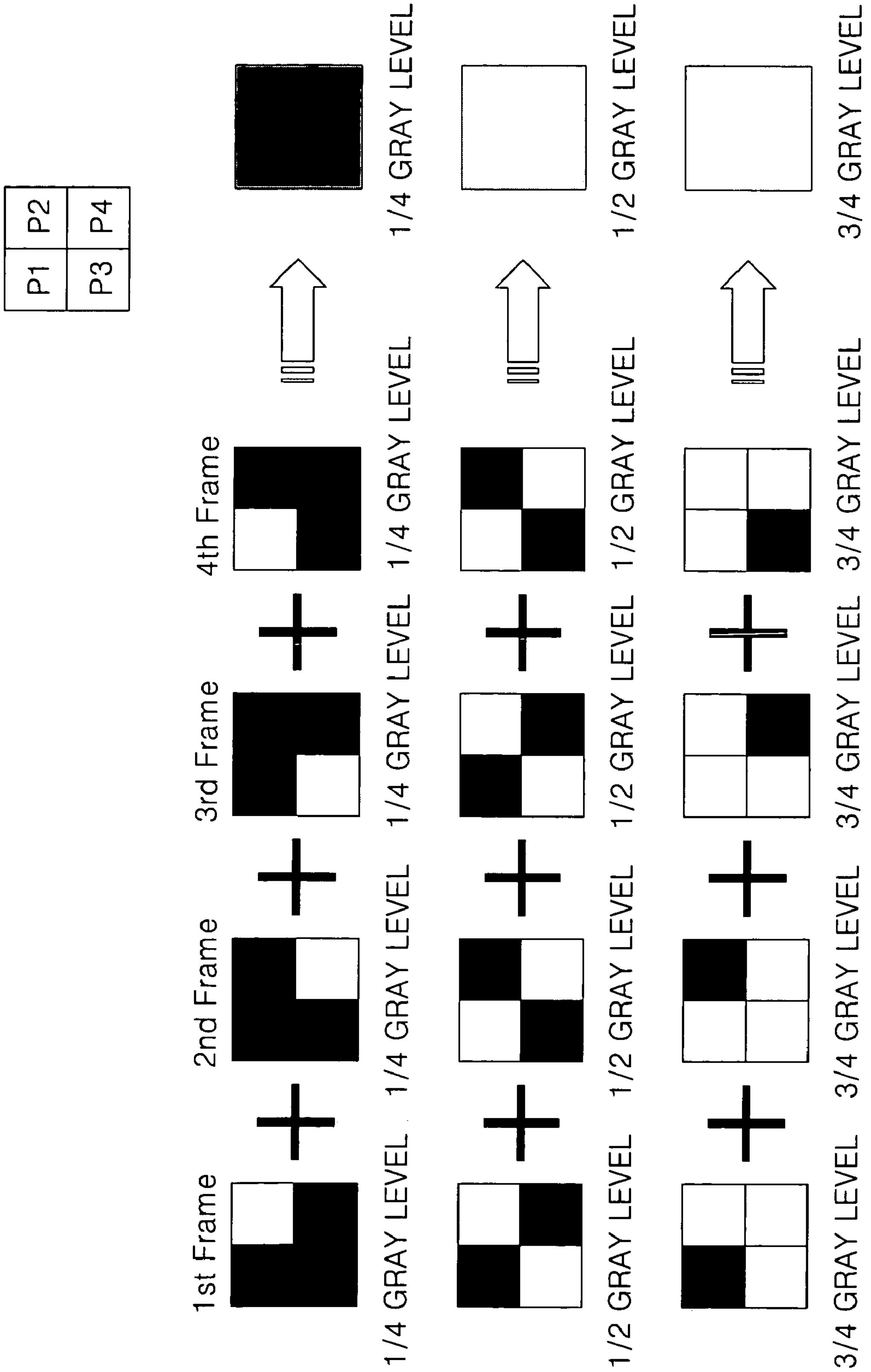
FIG. 15 is a view schematically illustrating an example of frame rate control and dithering.

The present invention not only uses each of the frame rate control and dithering, but also minutely adjusts the data at the panel defect location by mingling the frame rate control with the dithering as in FIG. 15, thereby reducing the deterioration of resolution which appears in the dithering and a flicker phenomenon which is generated in the frame rate control. FIG. 15 is a view schematically illustrating an example of frame rate control and dithering. As shown in FIG. 15, assume that a unit pixel window inclusive of four pixels P1, P2, P3 and P4 is sequentially displayed for four frames. As shown in (A) of FIG. 15, if the unit pixel window displays the '¼' gray level while one pixel where the '1' gray level is displayed is made to be different every frame for four frames, an observer feels that the gray level of the unit pixel window is the '¼' gray level for the four frames while almost not feeling the flicker and the resolution deterioration. As shown in (B) and (C) of FIG. 15, if the unit pixel window displays the '½' gray level or the '¾' gray level while two or three pixels where the '1' gray level is displayed is made to be different every frame for the four frames, the observer feels that the gray level of the unit pixel window is the '½' or '¾' gray level for the four frames while almost not feeling the flicker and the resolution deterioration. In the exemplary embodiments of the present invention, the number of frames of the frame rate control or the number of pixels included in the unit pixel window in the dithering may be variously adjusted as occasion demands.

Figure 16:
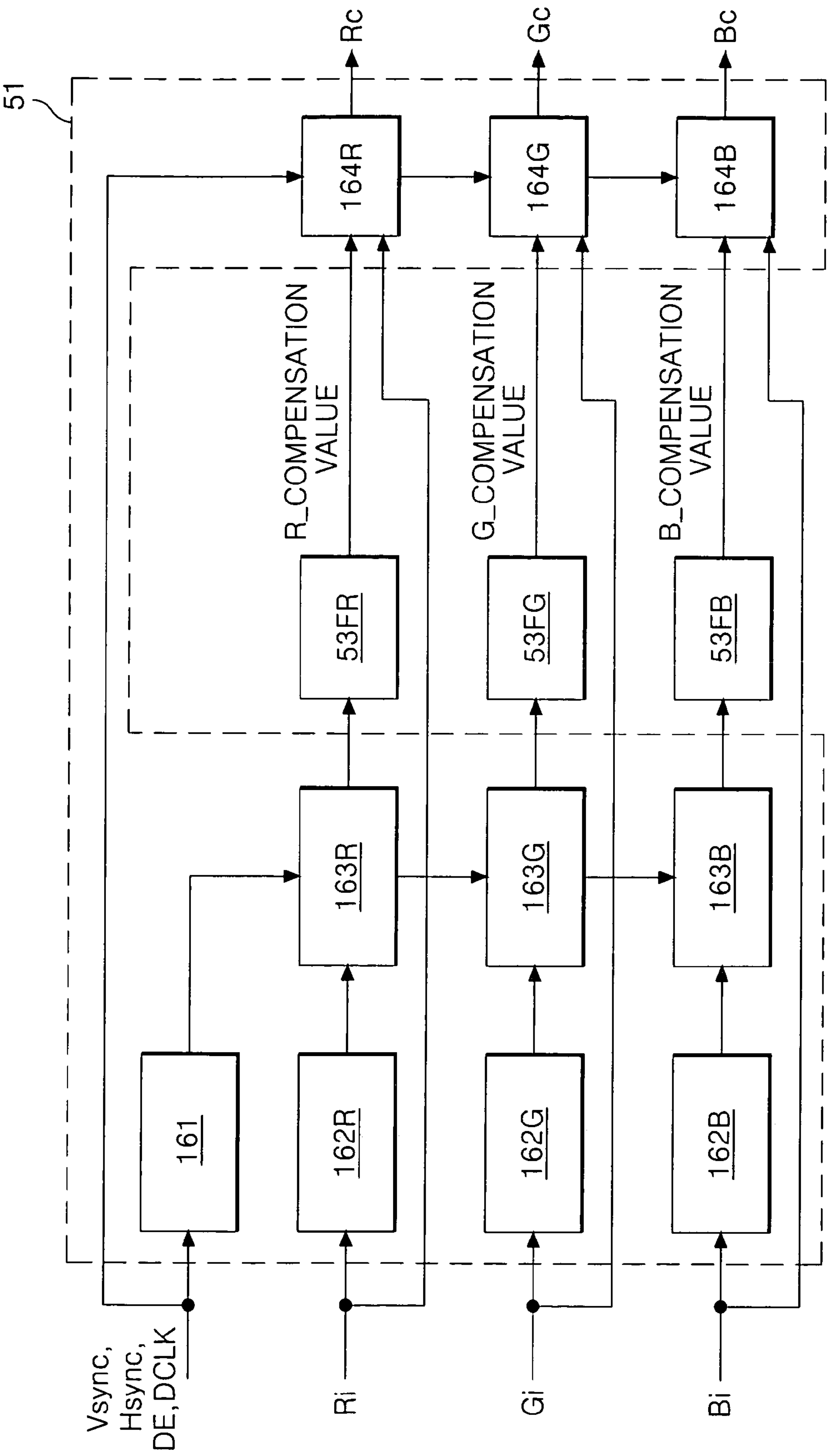
FIG. 16 is a block diagram schematically illustrating a panel defect compensation circuit according to a fourth embodiment of the present invention.

FIG. 16 is a block diagram schematically illustrating a panel defect compensation circuit 51 and an EEPROM 53 according to a fourth exemplary embodiment of the present invention.

As shown in FIG. 16, the panel defect compensation circuit 51 includes a location judging part 161, gray level judging parts 162R, 162G and 162B, address generators 163R, 163G and 163B, and FRC controllers 164R, 164G and 164B. The EEPROM 53 includes first to third EEPROM's 53FR, 53FG and 53FB that store the panel defect compensation data CD and the panel defect location data PD for red R, green G and blue B, respectively. The location judging part 161 judges the display location of the input digital video data Ri/Gi/Bi utilizing vertical/horizontal synchronization signals Vsync, Hsync, a data enable signal DE and a dot clock DCLK. The gray level judging parts 162R, 162G and 162B analyze the gray level of the input digital video data Ri/Gi/Bi of red R, green G and blue B. The address generators 163R, 163G and 163B generate a read address for reading the panel defect compensation data CD of the panel defect location to supply to the EEPROM's 53FR, 53FG and 53FB if the display location of the input digital video data Ri/Gi/Bi corresponds to the panel defect location by referring to the panel defect location data PD of the EEPROM 53R, 53G and 53B. The panel defect compensation data CD outputted from the EEPROM's 53FR, 53FG and 53FB are supplied to the FRC controllers 164R, 164G and 164B in accordance with the address. The FRC controllers 164R, 164G and 164B modulate the data to be displayed at the panel defect location by increasing or decreasing the input digital video data Ri/Gi/Bi by the panel defect compensation data CD from the EEPROM's 53FR, 53FG and 53FB. However, the number and sequence of frames where the panel defect compensation data CD are increased or decreased are made to be different in accordance with the panel defect compensation value, thereby dispersing the panel defect compensation data CD to a plurality of frames. For example, if the panel defect compensation data CD set as a compensation value to be compensated in the panel defect location are the '0.5' gray level, the FRC controllers 164R, 164G and 164B compensates the '0.5' gray level that is about the panel defect of the data Ri/Gi/Bi to be displayed at the panel defect location by adding the '1' gray level to the data of the corresponding panel defect location pixel for two frame periods among four frames. The FRC controllers 164R, 164G and 164B have the same circuit configuration as FIG. 17.

Figure 17:
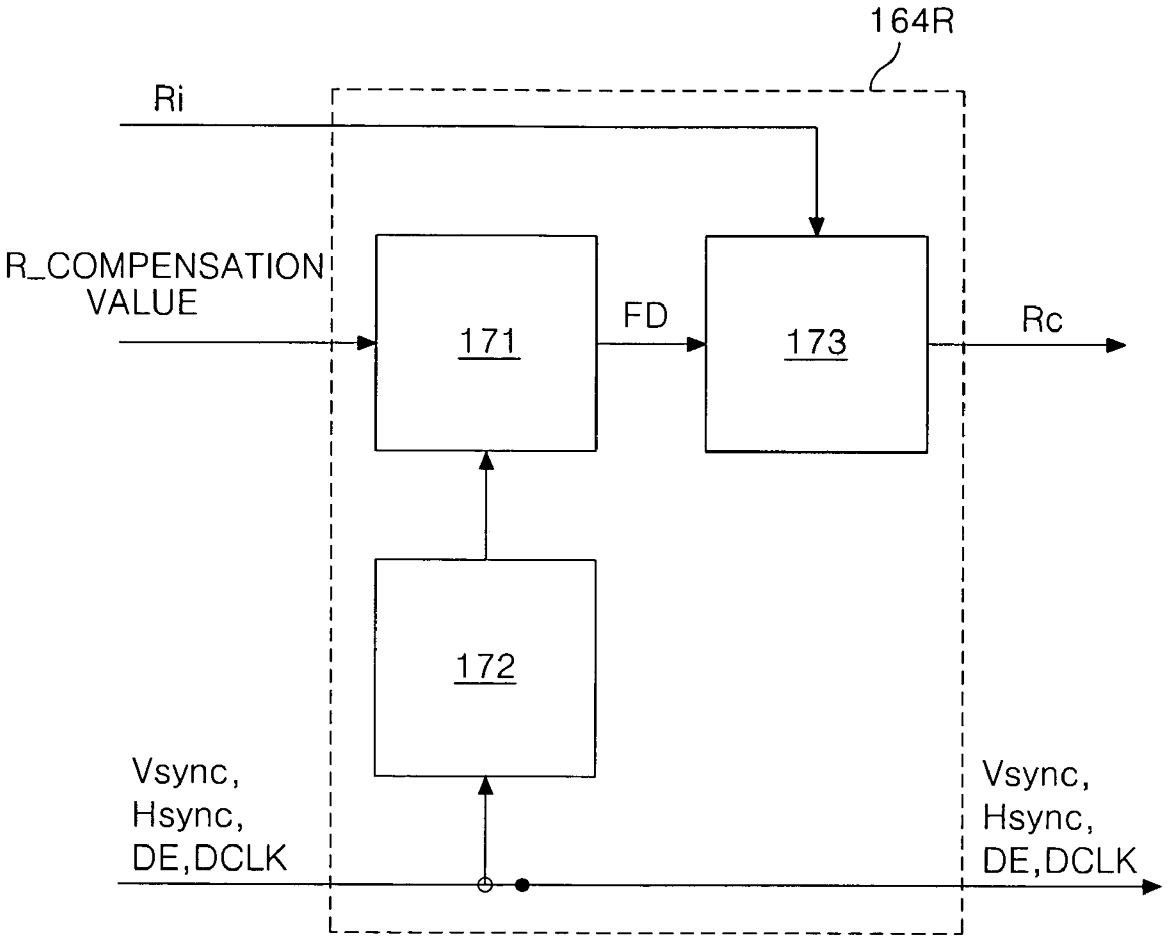
FIG. 17 is a block diagram schematically illustrating a first FRC controller of FIG. 16.

FIG. 17 illustrates a first FRC controller 164R for correcting red data in detail. Herein, second and third controllers 164G and 164B substantially have the same circuit configuration as the first FRC controller 164R.

As shown in FIG. 17, the first FRC controller 164R includes a compensation value judging part 171, a frame number sensing part 172 and a calculator 173. The compensation value judging part 171 judges an R compensation value and generates a FRC data FD with the value calculated by dividing the compensation value by the number of frames. For example, when four frames are taken as one frame group, if the R panel defect compensation data '00' is pre-set as the '0' gray level, the R panel defect compensation data '01' is pre-set as the '¼' gray level, the R panel defect compensation data '10' is pre-set as the '½' gray level, and the R panel defect compensation data '11' is pre-set as the '¾' gray level, the compensation value judging part 171 judges the R panel defect compensation data '01' as the data that the '¼' gray level is to be added to the display gray level of the data of the corresponding panel defect location. In this way, if the gray level of the R panel defect compensation data is judged, in order to compensate the '¼' gray level to the input digital video data Ri/Gi/Bi that are to be supplied to the corresponding panel defect location, the compensation value judging part 171 generates the FRC data FD of '1' in one frame period for the '1' gray level to be added to any one frame among the first to fourth frames and generates the FRC data FD of '0' for the other three frame periods.

The frame number sensing part 172 senses the number of frames utilizing not less than any one of the vertical/horizontal synchronization signal Vsync, Hsync, the dot clock DCLK and the data enable signal DE. For example, the frame number sensing part 172 counts the vertical synchronization signal Vsync, thereby sensing the number of frames. The calculator 173 increases and decreases the input digital video data Ri/Gi/Bi by the FRC data FD, thereby generating the corrected digital video data Rc. The panel defect compensation circuit 51 and the EEPROM 53 according to the third exemplary embodiment subdivides into 1021 gray levels to be able to minutely correct the data that are to be displayed at the panel defect location, assume that the panel defect compensation circuit 51 and the EEPROM 53 temporally disperse the compensation value by getting the input R. G. B digital video data to be 8 bits each and the four frame periods to be one frame group.

Figure 18:
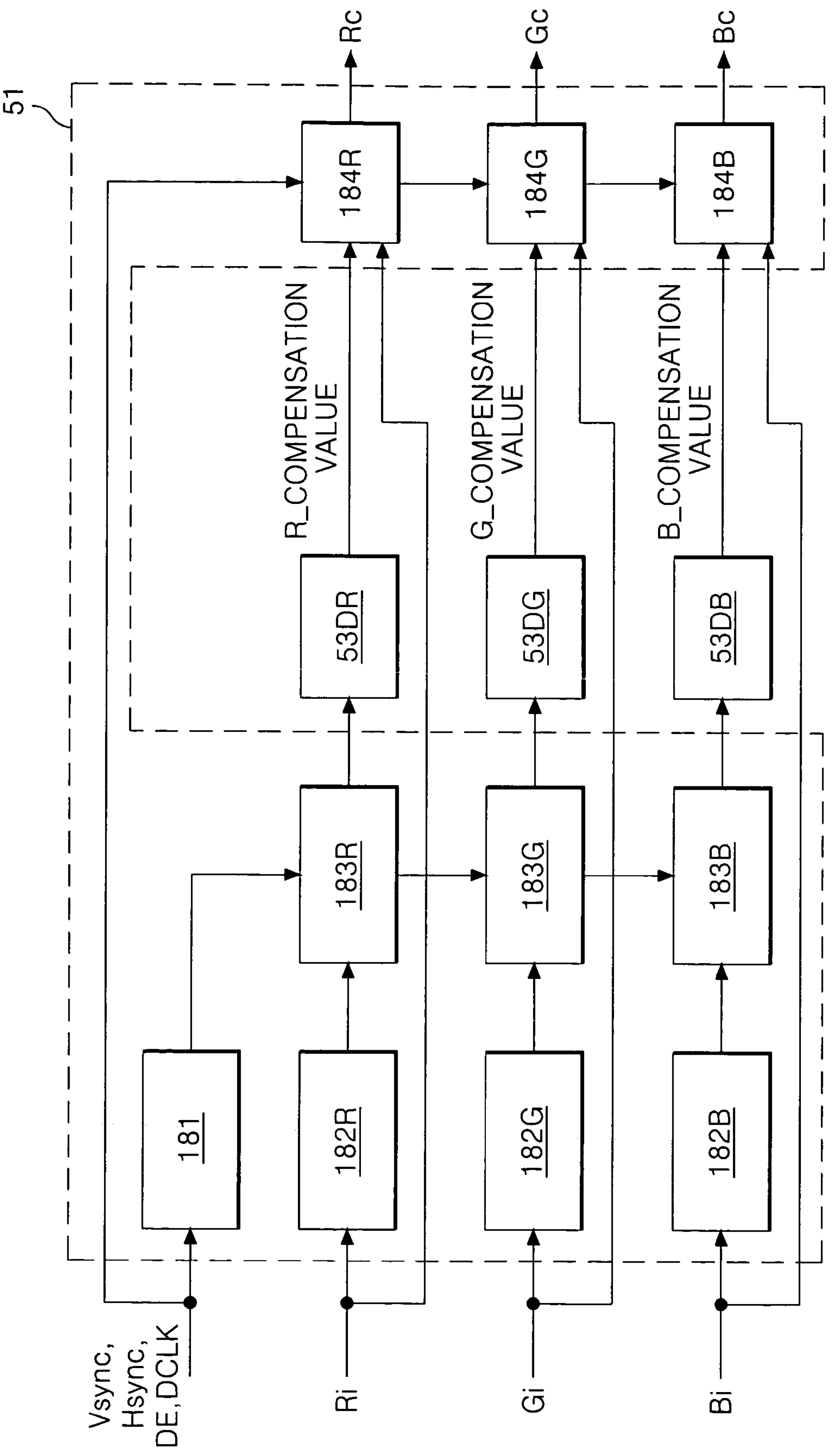
FIG. 18 is a block diagram schematically illustrating a panel defect compensation circuit according to a fifth embodiment of the present invention.

FIG. 18 schematically illustrates the panel defect compensation circuit 51 and the EEPROM 53 according to a fifth exemplary embodiment of the present invention.

As shown in FIG. 18, the panel defect compensation circuit 51 includes a location judging part 181, gray level judging parts 182R, 182G and 182B, address generators 183R, 183G and 183B, and dithering controllers 184R, 184G and 184B. The EEPROM 53 includes first to third EEPROM's 53DR, 53DG and 53DB that store the panel defect compensation data CD and the panel defect location data PD for red R, green G and blue B, respectively. The location judging part 181 judges the display location of the input digital video data Ri/Gi/Bi utilizing vertical/horizontal synchronization signals Vsync, Hsync, a data enable signal DE and a dot clock DCLK. The gray level judging parts 182R, 182G and 182B analyze the gray level of the input digital video data Ri/Gi/Bi of red R, green G and blue B. The address generators 183R, 183G and 183B generate a read address for reading the panel defect compensation data CD of the panel defect location to supply to the EEPROM's 53DR, 53DG and 53DB if the display location of the input digital video data Ri/Gi/Bi corresponds to the panel defect location by referring to the panel defect location data PD of the EEPROM 53DR, 53DG and 53DB. The panel defect compensation data CD outputted from the EEPROM's 53DR, 53DG and 53DB are supplied to the dithering controllers 184R, 184G and 184B in accordance with the address. The dithering controllers 184R, 184G and 184B disperse the panel defect compensation data CD from the EEPROM's 53DR, 53DG and 53DB to each pixel of the unit pixel window inclusive of a plurality of pixels to modulate the input digital video data Ri/Gi/Bi that are to be displayed at the panel defect location.

Figure 19:
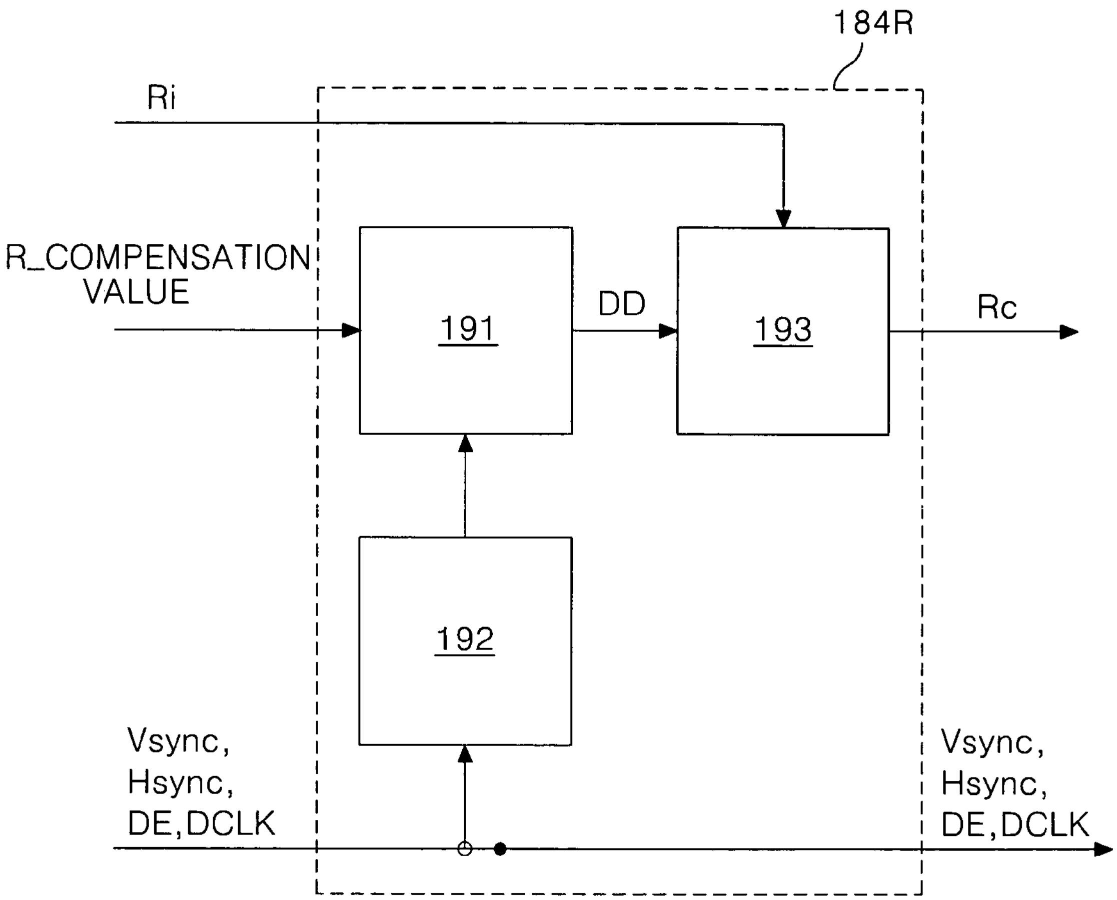
FIG. 19 is a block diagram schematically illustrating a first dithering controller shown in FIG. 18.

FIG. 19 schematically illustrates a first dithering controller 184R for correcting red data. Herein, second and third dithering controllers 184G and 184B substantially have the same circuit configuration as the first dithering controller 184R. As shown in FIG. 19, the first dithering controller 184R includes a compensation value judging part 191, a pixel location sensing part 192 and a calculator 193. The compensation value judging part 191 judges an R compensation value and generates a dithering data DD by taking the compensation value as the value that is to be dispersed to the pixels included in the unit pixel window. The compensation value judging part 191 is programmed to automatically output the dithering data in accordance with the R compensation value. For example, the compensation value judging part 191 may be pre-programmed for the dithering compensation value of the unit pixel window to be recognized as the '¼' gray level if the R compensation value expressed in binary data is '00', as the '½' gray level if the R compensation value is '10', and as the '¾' gray level if the R compensation value is '11'. Accordingly, the compensation value judging part 191 generates '1' as the dithering data DD in the pixel location within the unit pixel window if four pixels are included in the unit pixel window and the R compensation value is '01'. On the other hand, the compensation value judging part 191 generates '0' as the dithering data DD in the remaining three pixel locations. The dithering data DD are increased or decreased by the calculator 132 to the input digital video data for each pixel location within the unit pixel window as shown in FIG. 14.

The pixel location sensing part 192 senses the pixel location utilizing not less than any one of the vertical/horizontal synchronization signal Vsync, Hsync, the dot clock DCLK and the data enable signal DE. For example, the pixel location sensing part 192 may count the horizontal synchronization signal Hsync and the dot clock DCLK, thereby sensing the pixel location. The calculator 193 increases and decreases the input digital video data Ri/Gi/Bi by the dithering data DD to generate the corrected digital video data Rc. The panel defect compensation circuit 51 and the EEPROM 53 according to the fifth exemplary embodiment can minutely adjust the data, which is to be displayed at the panel defect location, with the compensation value that is subdivided into 1021 gray levels for each of R, G and B, assume that the unit pixel window is composed of four pixels.

Figure 20:
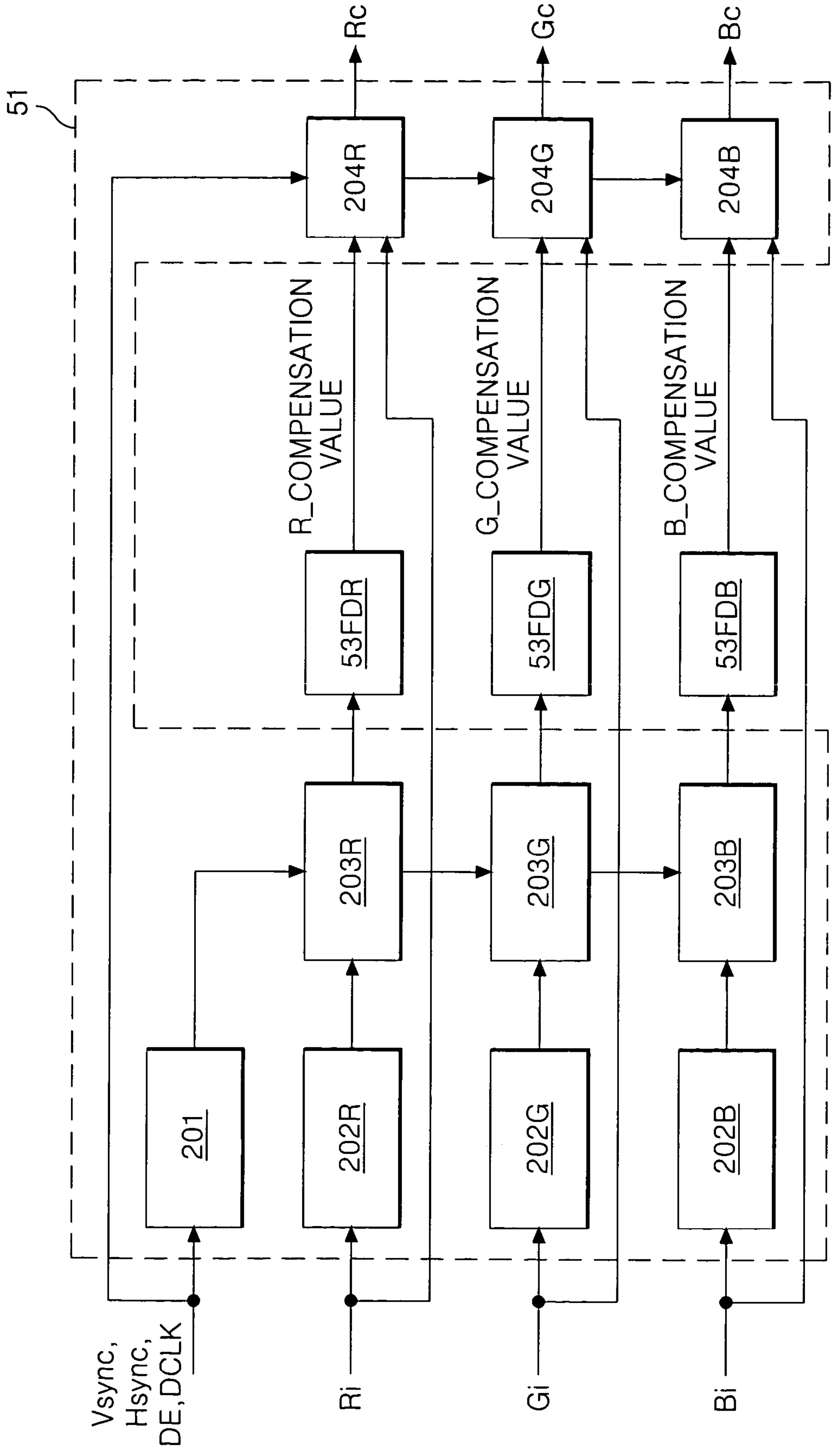
FIG. 20 is a block diagram schematically illustrating a panel defect compensation circuit according to a sixth embodiment of the present invention.

FIG. 20 schematically illustrates the panel defect compensation circuit 51 and the EEPROM 53 according to the sixth exemplary embodiment of the present invention.

As shown in FIG. 20, the panel defect compensation circuit 51 includes a location judging part 201, gray level judging parts 202R, 202G and 202B, address generators 203R, 203G and 203B, and FRC & dithering controllers 204R, 204G and 204B. The EEPROM 53 includes first to third EEPROM's 53FDR, 53FDG and 53FDB that store the panel defect compensation data CD and the panel defect location data PD for red R, green G and blue B, respectively. The location judging part 201 judges the display location of the input digital video data Ri/Gi/Bi utilizing vertical/horizontal synchronization signals Vsync, Hsync, a data enable signal DE and a dot clock DCLK. The gray level judging parts 202R, 202G and 202B analyze the gray level of the input digital video data Ri/Gi/Bi of red R, green G and blue B. The address generator 203R, 203G and 203B generate a read address for reading the panel defect compensation data CD of the panel defect location to supply to the EEPROM's 53FDR, 53FDG and 53FDB if the display location of the input digital video data Ri/Gi/Bi corresponds to the panel defect location by referring to the panel defect location data PD of the EEPROM 53FDR, 53FDG and 53FDB. The FRC & dithering controllers 204R, 204G and 204B disperse the panel defect compensation data CD from the EEPROM 53FDR, 53FDG and 53FDB to each pixel of the unit pixel window inclusive of a plurality of pixels and disperses the panel defect compensation data CD to a plurality of frame periods to modulate the input digital video data Ri/Gi/Bi that are to be displayed at the panel defect location.

Figure 21:
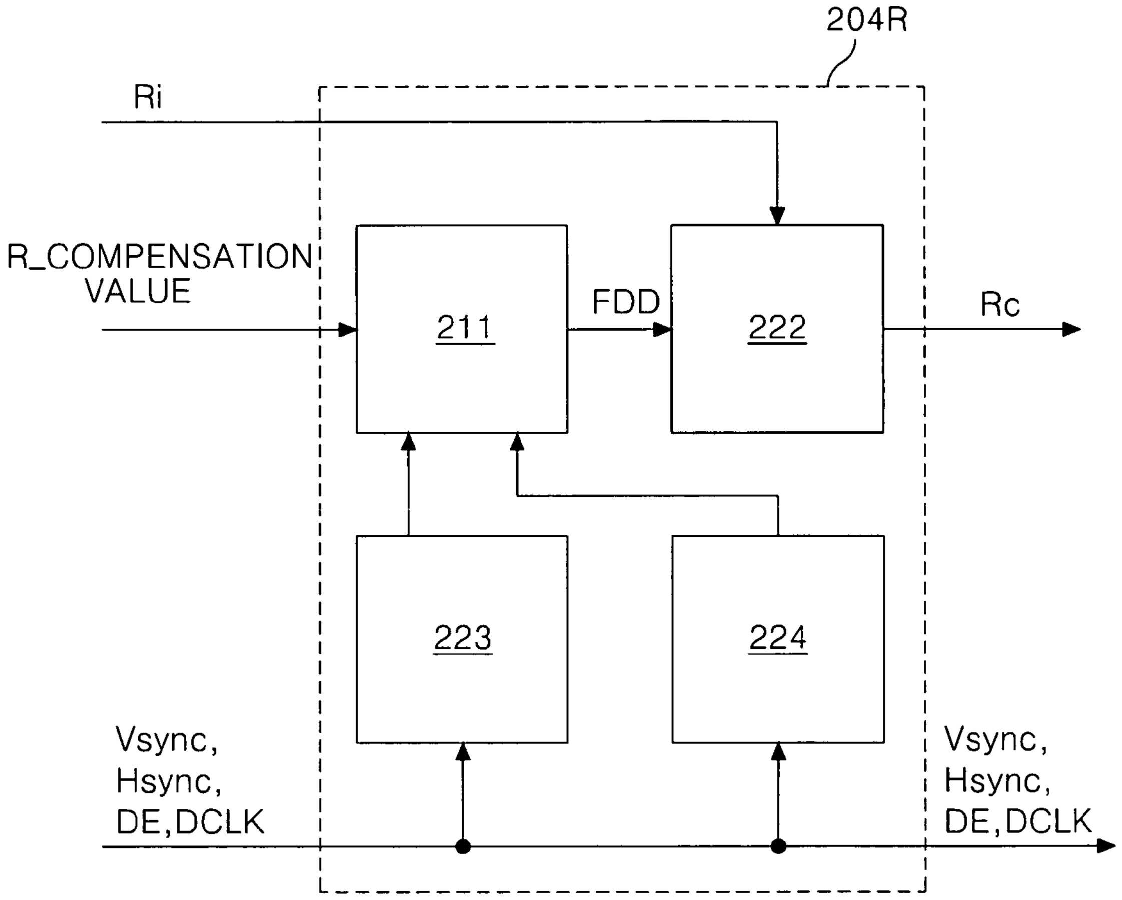
FIG. 21 is a block diagram schematically illustrating a first FRC and dithering controller shown in FIG. 20.

FIG. 21 schematically illustrates a first FRC & dithering controller 204R for correcting red data. Herein, second and third FRC & dithering controllers 204G, 204B substantially have the same circuit configuration as the first FRC & dithering controller 204R.

As shown in FIG. 21, the first FRC & dithering controller 204R includes a compensation value judging part 211, a frame number sensing part 223, a pixel location sensing part 224 and a calculator 222. The compensation value judging part 221 judges an R compensation value and generates an FRC & dithering data FDD by taking the compensation value as the value to be dispersed to the pixels included in the unit pixel window for the frame periods. The compensation value judging part 221 is programmed to automatically output the FRC & dithering data in accordance with the R compensation value. For example, the compensation value judging part 221 may be pre-programmed to recognize the compensation value for the '0' gray level if the R compensation data is '00', for the '¼' gray level if the R compensation data is '01', for the '½' gray level if the R compensation data is '10', and for the '¾' gray level if the R compensation data is '11'. Assume that the R panel defect compensation data is '01', the four frame periods are one FRC frame group and the four pixels compose one unit pixel window of dithering, the compensation value judging part 221 generates '1' as the FRC & dithering data FDD in one pixel location within the unit location for four frame periods and '0' as the FRC & dithering data FDD in the rest three pixel locations, but changes the location of the pixel where '1' is generated every frame.

The frame number sensing part 223 senses the number of frames utilizing not less than any one of the vertical/horizontal synchronization signal Vsync, Hsync, the dot clock DCLK and the data enable signal DE. For example, the frame number sensing part 223 may sense the number of frames by counting the vertical synchronization signal Vsync. The pixel location sensing part 224 senses the pixel location utilizing not less than any one of the vertical/horizontal synchronization signal Vsync, Hsync, the dot clock DCLK and the data enable signal DE. For example, the pixel location sensing part 224 may count the horizontal synchronization signal Hsync and the dot clock DCLK, thereby sensing the pixel location. The calculator 222 increases and decreases the input digital video data Ri/Gi/Bi by the FRC & dithering data FDD to generate the corrected digital video data Rc. The panel defect compensation circuit 51 and the EEPROM 53 according to the sixth embodiment of the present invention can minutely adjust the data, which is to be displayed at the panel defect location, with the compensation value which is subdivided into 1021 gray levels for each of R, G, B, while there is almost no flicker and resolution deterioration, assume that the unit pixel window is composed of four pixels and the four frame periods are one FEC frame group.

As described above, the method and apparatus for fabricating the flat panel display device according to the exemplary embodiments of the present invention can minutely compensate the brightness and chromaticity of the panel defect as well as can compensate the panel defect with the electrical compensation data regardless of the size or shape of the panel defect in the fabrication process.

Although the present invention has been explained by the exemplary embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a flat panel display device, comprising:

inspecting the flat panel display device by supplying test data and a test scan signal to data electrodes of the flat panel display device to generate an inspection result;

judging a location of a panel defect in the flat panel display device and a degree of the panel defect at the panel defect location in accordance with the inspection result and determining compensation data for compensating the degree of the panel defect; and storing the compensation data for compensating the degree of the panel defect at a data modulation memory of the flat panel display device, wherein the flat panel display device comprises:

a compensation circuit connected to the data modulation memory and utilizing the compensation data to modulate the data, which are to be displayed at the panel defect location;

a liquid crystal display panel where a plurality of data lines cross a plurality of gate lines, and a plurality of liquid crystal cells are arranged;

a data drive circuit for driving the data lines by utilizing the data modulated with the compensation data;

a gate drive circuit for supplying a scan pulse to the gate lines; and a timing controller for controlling the drive circuits and supplying the compensation data to the data drive circuit, wherein the compensation circuit is embedded in the timing controller.

2. The fabricating method according to claim 1, wherein the compensation data include:

location data for indicating the panel defect location; and gray level compensation data for each gray level, which are set to be different for each gray level of data to be displayed at the panel defect location.

3. The fabricating method according to claim 1, wherein the compensation data include:

an R compensation data for compensating red data;

a G compensation data for compensating green data; and a B compensation data for compensating blue data, wherein the R compensation data, the G compensation data and the B compensation data are set to be the same value in the same gray level of the same pixel location.

4. The fabricating method according to claim 1, wherein the compensation data include:

an R compensation data for compensating red data;

a G compensation data for compensating green data; and a B compensation data for compensating blue data, wherein a compensation value of at least one of the R compensation data, the G compensation data and the B compensation data is different from that of the other compensation data in the same gray level of the same pixel location.

5. The fabricating method according to claim 1, wherein the data modulation memory includes a non-volatile memory where data are renewable.

6. The fabricating method according to claim 5, wherein the memory includes any one of EEPROM and EDID ROM.

7. The fabricating method according to claim 1, wherein the compensation circuit increases or decreases data, which are to be displayed at the panel defect location, with the compensation data.

8. The fabricating method according to claim 1, wherein the compensation circuit extracts a color difference value and a brightness value of n (n is an integer larger than m) bits in data of red color of m bits, green color of m bits and blue color of m bits that are to be displayed at the panel defect location; generates the brightness value of n bits that is modulated by increasing or decreasing the brightness value of n bits with the compensation data, and generates the modulated red data of m bits, the modulated green data of m bits and the modulated blue data of m bits by utilizing the modulated brightness value and the color difference value that is un-modulated.

9. The fabricating method according to claim 8, wherein the compensation data are set to be different for each location of the panel defect location and for each gray level of data that are to be displayed at the panel defect location.

10. The fabricating method according to claim 1, wherein the compensation circuit temporally disperses the compensation data, and increases or decreases data, which are to be displayed at the panel defect location, with the compensation data that are temporally dispersed.

11. The fabricating method according to claim 10, wherein the compensation data are dispersed by the unit of a frame period.

12. The fabricating method according to claim 1, wherein the compensation circuit spatially disperses the compensation data, and increases or decreases data, which are to be displayed at the panel defect location, with the compensation data that are spatially dispersed.

13. The fabricating method according to claim 12, wherein the compensation data are dispersed to adjacent pixels.

14. The fabricating method according to claim 1, wherein the compensation circuit temporally and spatially disperses the compensation data, and increases or decreases data, which are to be displayed at the panel defect location, with the compensation data that are temporally and spatially dispersed.

15. The fabricating method according to claim 14, wherein the compensation data are dispersed to a plurality of frame periods and to adjacent pixels.

16. A fabricating apparatus of a flat panel display device, comprising:

an inspection device for inspecting the flat panel display device by supplying test data and a test scan signal to data electrodes of the flat panel display device to generate an inspection result;

a panel defect judging device for judging a location of a panel defect in the flat panel display device and a degree of the panel defect at the panel defect location in accordance with the inspection result of the inspection device and determining compensation data for compensating the degree of the panel defect; and a memory recording device for storing the compensation data for compensating the degree of the panel defect at a data modulation memory of the flat panel display device, wherein the flat panel display device comprises:

a compensation circuit connected to the data modulation memory and utilizing the compensation data to modulate the data, which are to be displayed at the panel defect location;

a liquid crystal display panel where a plurality of data lines cross a plurality of gate lines, and a plurality of liquid crystal cells are arranged;

a data drive circuit for driving the data lines by utilizing the data modulated with the compensation data;

a gate drive circuit for supplying a scan pulse to the gate lines; and a timing controller for controlling the drive circuits and supplying the compensation data to the data drive circuit, wherein the compensation circuit is embedded in the timing controller.

17. The fabricating apparatus according to claim 16, wherein the compensation data include:

location data for indicating the panel defect location; and gray level compensation data for each gray level, which are set to be different for each gray level of data that are to be displayed at the panel defect location.

18. The fabricating apparatus according to claim 16, wherein the compensation data include:

an R compensation data for compensating red data;

a G compensation data for compensating green data; and a B compensation data for compensating blue data, wherein the R compensation data, the G compensation data and the B compensation data are set to be the same value in the same gray level of the same pixel location.

19. The fabricating apparatus according to claim 16, wherein the compensation data include:

an R compensation data for compensating red data;

a G compensation data for compensating green data; and a B compensation data for compensating blue data, wherein a compensation value of at least one of the R compensation data, the G compensation data and the B compensation data is different from that of the other compensation data in the same gray level of the same pixel location.

20. The fabricating apparatus according to claim 16, wherein the memory includes a non-volatile memory where data are renewable.

21. The fabricating apparatus according to claim 20, wherein the memory includes one of EEPROM and EDID ROM.

22. The fabricating apparatus according to claim 16, wherein the compensation circuit increases or decreases data, which are to be displayed at the panel defect location, with the compensation data.

23. The fabricating apparatus according to claim 22, wherein the compensation circuit extracts a color difference information and a brightness information of n (n is an integer larger than m) bits in the data of red color of m bits, green color of m bits and blue color of m bits which are to be displayed at the panel defect location, generates the brightness information of n bits which is modulated by increasing or decreasing the brightness information of n bits with the compensation data, and generates the modulated red data of m bits, the modulated green data of m bits and the modulated blue data of m bits by utilizing the modulated brightness information of n bits and the color difference information that is un-modulated.

24. The fabricating apparatus according to claim 23, wherein the compensation data are set to be different for each location of the panel defect location and for each gray level of data which are to be displayed at the panel defect location.

25. The fabricating apparatus according to claim 16, wherein the compensation circuit temporally disperses the compensation data, and increases or decreases data, which are to be displayed at the panel defect location, with the compensation data that are temporally dispersed.

26. The fabricating apparatus according to claim 25, wherein the compensation data are dispersed by the unit of a frame period.

27. The fabricating apparatus according to claim 16, wherein the compensation circuit spatially disperses the compensation data, and increases or decreases data, which are to be displayed at the panel defect location, with the compensation data that are spatially dispersed.

28. The fabricating apparatus according to claim 27, wherein the compensation data are dispersed to adjacent pixels.

29. The fabricating apparatus according to claim 16, wherein the compensation circuit temporally and spatially disperses the compensation data, and increases or decreases data, which are to be displayed at the panel defect location, with the compensation data that are temporally and spatially dispersed.

30. The fabricating apparatus according to claim 29, wherein the compensation data are dispersed to a plurality of frame periods and to adjacent pixels.

* * * * *